US008081562B2

(12) United States Patent
Charpentier et al.

(10) Patent No.: US 8,081,562 B2
(45) Date of Patent: Dec. 20, 2011

(54) CONFIGURABLE ACKNOWLEDGEMENT MODE FOR A HYBRID AUTOMATIC REPEAT REQUEST PROTOCOL

(75) Inventors: Frederic Charpentier, Langen (DE); Eiko Seidel, Langen (DE); Joachim Lohr, Langen (DE)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 12/094,579

(22) PCT Filed: Nov. 17, 2006

(86) PCT No.: PCT/EP2006/011069
§ 371 (c)(1),
(2), (4) Date: Aug. 6, 2008

(87) PCT Pub. No.: WO2007/062754
PCT Pub. Date: Jun. 7, 2007

(65) Prior Publication Data
US 2008/0310338 A1 Dec. 18, 2008

(30) Foreign Application Priority Data

Nov. 30, 2005 (EP) .................................. 05026148

(51) Int. Cl.
*G06F 11/08* (2006.01)
(52) U.S. Cl. .......................................... 370/216; 370/255
(58) Field of Classification Search .................. 370/229, 370/235, 252, 254, 310, 331, 332, 466–469; 455/426.1, 436
See application file for complete search history.

(56) References Cited

U.S. PATENT DOCUMENTS

| | | | |
|---|---|---|---|
| 7,818,647 B2 * | 10/2010 | Lohr et al. | 714/750 |
| 2004/0228320 A1 * | 11/2004 | Laroia et al. | 370/349 |
| 2008/0043619 A1 * | 2/2008 | Sammour et al. | 370/231 |

FOREIGN PATENT DOCUMENTS

| | | |
|---|---|---|
| EP | 1 168 703 | 1/2002 |
| WO | 2004/075023 | 9/2004 |
| WO | 2004/100566 | 11/2004 |

OTHER PUBLICATIONS

International Search Report dated Feb. 14, 2007.

* cited by examiner

*Primary Examiner* — Seema S Rao
*Assistant Examiner* — Mon Cheri Davenport
(74) *Attorney, Agent, or Firm* — Dickinson Wright PLLC

(57) ABSTRACT

The present invention relates to a method for configuring an acknowledgement mode of an HARQ re-transmission protocol used for acknowledging the delivery of data packets of a service provided from a transmitting entity to a receiving entity in a wireless communication system comprising a controlling entity in a radio access network. To improve the overall transmission efficiency while providing transmission robustness, the controlling entity configures, based on at least one of a QoS attribute or physical layer parameter, one of a first and second acknowledgement mode. An acknowledgement message is transmitted according to the configured acknowledgement mode, wherein, in case the data packet has not been decoded successfully by the receiving entity, the acknowledgement message in the first acknowledgement mode indicates one of a plurality of decoding quality levels of the data packet obtained when decoding the data packet at the receiving entity, and the acknowledgement message in the second acknowledgement mode indicates a decoding failure of the data packet.

36 Claims, 13 Drawing Sheets localized resource allocation distributed resource allocation

CONFIGURABLE ACKNOWLEDGEMENT MODE FOR A HYBRID AUTOMATIC REPEAT REQUEST PROTOCOL

FIELD OF THE INVENTION

The present invention relates to a method for configuring an acknowledgement mode of a Hybrid Automatic Repeat ReQuest (HARQ) re-transmission protocol and to a wireless communication system adapted to configure an acknowledgement mode of a HARQ re-transmission protocol. The method according to the present invention is generally applicable to any system in a mobile communication network employing a HARQ protocol with multi-level Negative ACKnowledgement (NACK) signaling in either the Downlink or the Uplink direction.

BACKGROUND OF THE INVENTION

W-CDMA (Wideband Code Division Multiple Access) is a radio interface for IMT-2000 system (International Mobile Telecommunication system), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4, Release 5 and Release 6. A discussion on further improvements is ongoing under the scope of Release 7 and Study Item on Evolved UMTS Terrestrial Radio Access (UTRA) and UMTS Terrestrial Radio Access Network (UTRAN).

In the following, the legacy UTRAN Release 5 architecture and Radio Interface Protocol Architecture is described in detail.

UMTS Architecture

The high level Release 99/4/5 architecture of Universal Mobile Telecommunication System (UMTS) is shown in FIG. 1 (see 3GPP TR 25.401: "UTRAN Overall Description", available from http://www.3gpp.org). The UMTS system consists of a number of network elements each having a defined function. Though the network elements are defined by their respective function, a similar physical implementation of the network elements is common but not mandatory.

The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Functionally, the RNC 201, 202 owns and controls the radio resources in its domain and typically terminates the Radio Resource Control protocol on the access network side. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used. Commonly, a Drift RNS 302 is used for soft handovers of UEs between different RNS.

In the following, it will often be assumed that the C-RNC and D-RNC are coincident and in this case only abbreviations S-RNC or RNC will be used.

General Description of the Protocol Model of the UTRAN Terrestrial Interfaces

FIG. 4 shows an overview of the protocol model of the UTRAN in an UMTS network. For a better understanding, only a brief description is provided herein; further details may be found in Holma et al., "WCDMA for UMTS", Third Edition, Wiley & Sons, Inc., October 2004, Chapter 5.

On the horizontal plane, the protocol model can be split into the radio network layer and the transport network layer. All UTRAN-related issues are visible and handled on the radio network layer, while transport network layer typically represents standard transport technology that is selected to be used for data transport for the UTRAN without any UTRAN-specific changes.

On the vertical plane, the protocol model can be split into control plane and user plane. The control plane is used for UMTS-specific control signaling (i.e. radio network layer related control signaling) and includes the Application Protocol (AP), e.g. RANAP on the Iu interfaces, RNSAP on the Iur interfaces, NBAP on the Iub and RRC on Uu interfaces. The control plane functions and Application Protocol allows setting up traffic radio bearers to the UEs via so-called signaling radio bearers.

While the control plane protocols are responsible for the UMTS-specific control signaling, the user plane transports the data streams sent by and sent to the users, such as voice calls, streaming data, packets of packet-switched services, etc. For transport, the user plane contains the so-called traffic radio bearers (also sometimes referred to as Data Bearers).

The transport network control plane is used for control signaling within the transport network layer and does not include any radio network layer related information. The transport network control plane includes the ALCAP protocol, which is used to set up the traffic radio bearers for exchanging user plane information and the signaling radio bearers required for communicating ALCAP protocol messages. Due to the presence of the transport network control plane, the Application Protocol within the control plane may operate completely independently from the technology selected for data transport on the traffic radio bearers in the user plane. The transport network control plane controls the operation of the transport network user plane.

UTRA Radio Interface Protocol Architecture

An overview of the radio interface protocol architecture of the UTRAN is shown in FIG. 5. Generally, the radio interface protocol architecture of the UTRAN implements Layers 1 to 3 of the OSI protocol stack. The protocols terminated in the UTRAN are also referred to as the access stratum (protocols). In contrast to the access stratum, all protocols not terminated in the UTRAN are typically referred to as the non-access stratum protocols.

As has been discussed with respect to FIG. 4, the vertical split of the protocols into user plane and control plane is illustrated. The Radio Resource Control (RRC) protocol is a Layer 3 protocol of the control plane which controls the protocols in the lower layers of the UTRA Radio Interface (Uu).

The RRC protocol is typically terminated in the RNC of the UTRAN, however other network elements have also been considered for terminating the RRC protocol in the UTRAN, e.g. the Node Bs. The RRC protocol is used for signaling of control information to control access to radio resources of the radio interface to the UEs. Further, there is also the possibility that the RRC protocol encapsulates and transports non-access stratum protocol messages, which are usually related to control within the non-access stratum protocol.

In the control plane, the RRC protocol relays the control information to Layer 2, i.e. the Radio Link Control (RLC) protocol, via signaling radio bearers through Service Access Points (SAPs). In the user plane the non-access stratum protocol entities may use traffic radio bearers to directly access Layer 2 via SAPs. The access may be made to the RLC directly or to the Packed Data Convergence Protocol which in turn provides its PDUs to the RLC protocol entity.

The RLC offers the SAPs to the higher layers. The SAPs define how RLC will handle the packets, e.g. whether RLC is operating in transparent, acknowledged or unacknowledged mode. The services provided to the higher layers in the control plane and user plane by the RRC or PDCP are also referred to as signaling radio bearer and traffic radio bearer, respectively.

The MAC/RLC layer in turn offers its services to the RLC layer by means of so-called logical channels. The logical channels essentially define what kind of data is transported. The physical layer offers its services to the MAC/RLC layer, the so-called transport channels. The transport channels define how and with which characteristics the data received from the MAC layer are transmitted via the physical channels.

Functional Distribution and Protocol Architecture

Functions of relevance to the invention that are located in the User Plane and Control Plane of the described network elements are exposed in the following.

RNC: Control Plane Functions

The Radio Resource Control (RRC) protocol on the network side is terminated in the RNC. It comprises, among others, the following functions that are relevant for the present invention:

Control of radio bearers, transport channels and physical channels,

Measurement control and processing of measurement reports,

RRC connection mobility functions.

The Node B Application Part (NBAP) protocol, Radio Network Subsystem Application Protocol (RNSAP) and Radio Access Network Application Part (RANAP) protocol are terminated in RNC on Iub, Iur and Iu interfaces, respectively.

The following procedures of NBAP are used to support the previously mentioned RRC functions:

Radio Link Setup common NBAP procedure (NBAP)
Radio Link Addition/Deletion dedicated NBAP procedure (NBAP)
Radio Link Reconfiguration procedure (NBAP)

RNC: User Plane Functions

The RNC terminates the MAC and RLC protocols on the network side according to the Release 99/4 protocol architecture. User Plane protocol stack architecture of relevance to Release 5 High Speed Downlink Packet Access (HSDPA) and High Speed Uplink Packet Access (HSUPA) will be exposed in the following. The settings of these protocols are controlled by the RRC.

Node B: User Plane/Control Plane Functions

Only the physical layer is terminated on the network side in Release 99/4 Node B. Release 5 Node B terminates the MAC layer for the High Speed-Dedicated Shared Channel (HS-DSCH) transport channel (MAC-hs), as will be explained later. Apart from terminating the NBAP protocol on the Iub interface, there is no control function in the Node B.

User Plane Protocol Stack Architecture in Case of HSDPA

The User Plane Radio Interface Protocol Architecture of HSDPA is shown in FIG. 6. The HARQ protocol and scheduling function belong to the MAC-hs sub-layer that is distributed across the Node B and UE. It should be noted that a selective repeat (SR) Automatic Repeat Request (ARQ) protocol based on sliding window mechanisms could also be established between the RNC and UE on the level of the RLC sub-layer in acknowledged mode. The service that is offered from the RLC sub-layer for point-to-point connection between the RNC and UE is referred to as a radio bearer.

Parameters of the protocols are configured by signaling in the Control Plane. This signaling is controlled by the Radio Resource Control (RRC) protocol for the signaling between radio network (S-RNC and UE) and by application protocols, NBAP on the Iub interface and RNSAP on the Iur interface.

User Plane Protocol Stack Architecture in Case of HSUPA

The User Plane Radio Interface Protocol Architecture of HSUPA is shown in FIG. 7. The HARQ protocol and scheduling function belong to the MAC-e sub-layer that is distributed across the Node B and UE. Reordering functions are necessary in soft handover in order to reorder data packets coming from different cells. These functions are located at the MAC-es at the S-RNC. As in HSDPA, parameters of the protocols are configured by signaling in the Control Plane. This signaling is controlled by the Radio Resource Control (RRC) protocol for the signaling between the radio network (S-RNC and UE) and by application protocols, NBAP on the Iub interface and RNSAP on the Iur interface.

Radio Bearer Establishment

Prior any transmission of data, the corresponding radio bearers are established and all layers are configured accordingly. The procedures for establishing radio bearers may vary according to the relation between the radio bearer and a dedicated transport channel. Depending on the Quality of Service parameters, there may or may not be a permanently allocated dedicated channel associated with a radio bearer.

In the following, an exemplary radio bearer establishment procedure with a dedicated physical channel activation in a legacy UMTS system will be explained based on FIG. 8.

The procedure shown in FIG. 8 is applied when a new physical channel needs to be created for a radio bearer. A radio bearer establishment is initiated when a RB Establish Request primitive is received from the higher layer Service Access Point on the network side of the RRC layer. This primitive contains a bearer reference and Quality of Service parameters. Based on these Quality of Service parameters, L1 and L2 parameters are chosen by the RRC entity on the network side. RRC determines the radio bearer parameters that are most appropriate for carrying data of the application/service based on the Quality of Service parameters of the application/service.

The physical layer processing on the network side is started with the CPHY-RL-Setup request primitive issued to all applicable Node Bs. If any of the intended recipients is unable to provide the service, it will be indicated in a confirmation primitive. After setting up L1, including the start of Transmission/Reception in Node B, the NW-RRC sends a RADIO BEARER SETUP message to its peer entity (acknowledged or unacknowledged transmission optional). This message contains L1, MAC and RLC parameters. For example, at radio bearer setup, each involved logical channel is configured with a MAC logical channel priority in the range of 1 to 8. The MAC logical channel Priority is contained in the information element RB mapping info. After receiving the message, the UE-RRC configures L1, MAC and RLC in accordance to the signaled parameters.

When L1 synchronisation is indicated, the UE sends a RADIO BEARER SETUP COMPLETE message in acknowledged-mode back to the network. The NW-RRC configures MAC and RLC on the network side. After receiving the confirmation for the RADIO BEARER SETUP COMPLETE, the UE-RRC creates a new RLC entity associated with the new radio bearer. The applicable method of RLC establishment may depend on RLC transfer mode. The RLC connection can be either implicitly established, or explicit signaling can be applied. Finally, an RB Establish Indication primitive is sent by the UE-RRC and an RB Establish Confirmation.

It is also possible to change radio bearer properties in the course of an active connection. The radio bearer reconfiguration procedure is used to reconfigure parameters for an already established radio bearer.

Evolved UTRA Radio Interface Protocol Architecture

Currently, evolutions of the radio interface as well as the radio network architecture are investigated in the recently introduced study item "Evolved UTRA and UTRAN" in 3GPP. The aim of the study item is to ensure competitiveness of the 3GPP radio-access technology in a long time frame. The targeted goals include reduced latency, higher user data rates, optimised support for packet services, improved system capacity and coverage, and reduced cost for the operator, while reducing system complexity.

The current architecture is shown in FIG. 9, where the RRC is fully located at the RNC and the layer 2 (MAC sub-layers and RLC) are distributed over the Node B and the RNC. Several different proposals on the architecture are currently discussed. One of the proposals is illustrated in FIG. 10. The proposal consists in moving the complete layer 2 (MAC and RLC) and maybe part of the RRC functionality, that reside in the legacy UMTS Release 6 system in the RNC, towards the air interface, i.e. to the Node B, in order to reduce latency. Another proposal under discussion is shown in FIG. 11, wherein the legacy RNC in the evolved UTRAN architecture is removed and the functionalities formerly located in the RNC are distributed across the Node B and SGSN (Serving GPRS Support Node), which is a part of the Core Network.

Resource Allocation Techniques in Orthogonal Frequency Division Multiplexing Access OFDMA, also referred to as Multi-user OFDM, is being considered as a modulation and multiple access method for future generation wireless networks. OFDMA is an extension of Orthogonal Frequency Division Multiplexing (OFDM), which is already employed in data access systems such as IEEE 802.11 wireless LAN (WiFi) and IEEE 802.16 wireless broadband access systems (WiMAX).

The basic principle of Orthogonal Frequency Division Multiplexing (OFDM) is to split the frequency band into a number of narrowband channels. Therefore, OFDM allows transmitting data on relatively flat parallel channels (sub-carriers) even if the channel of the whole frequency band is frequency selective due to a multi-path environment. Since the sub-carriers experience different channel states, the capacities of the sub-carriers vary and permit a transmission on each subcarrier with a distinct data-rate. Hence, sub carrier-wise (frequency domain) Link Adaptation by means of Adaptive Modulation and Coding increases the radio efficiency by transmitting different data-rates over the sub-carriers. OFDMA allows multiple users to transmit simultaneously on the different sub-carriers per OFDM symbol. Since the probability that all users experience a deep fade in a particular sub-carrier is very low, it can be assured that sub-carriers are assigned to the users who see good channel gains on the corresponding sub-carriers. When allocating resources in the downlink to different users in a cell, the scheduler takes information on the channel status experienced by the users for the sub-carriers into account. The control information signaled by the users, i.e. CQI, allows the scheduler to exploit the multi-user diversity, thereby increasing the spectral efficiency.

Two different resource allocation methods can be distinguished based on the radio access scheme that distributes available frequency spectrum among different users in OFDMA. The first allocation mode, called localized mode, tries to benefit fully from frequency scheduling gain by allocating the sub-carriers on which a specific UE experiences the best radio channel conditions. Since this scheduling mode requires associated signaling (resource allocation signaling, CQI in uplink), this mode would be best suited for non-real time, high data rate oriented services. In the localized resource allocation mode a user is allocated continuous blocks of sub-carriers.

The second resource allocation mode, called distributed mode, relies on the frequency diversity effect to achieve transmission robustness by allocating resources that are scattered over time and frequency grid. The fundamental difference with localized mode is that the resource allocation algorithm does not try to allocate the physical resources based on some knowledge on the reception quality at the receiver but select more or less randomly the resource it allocates to a particular UE. This distributed resource allocation method seems to be best suited for real-time services as less associated signaling (no fast CQI, no fast allocation signaling) relative to the localized mode is required.

The two different resource allocation methods are shown in FIG. 12 for an OFDMA based radio access scheme. As can be seen from the left-hand part of the figure, which depicts the localized resource allocation mode, the localized mode is characterized by the transmitted signal having a continuous spectrum that occupies a part of the total available spectrum. Different symbol rates (corresponding to different data rates) of the transmitted signal imply different bandwidths (time/frequency bins) of a localized signal.

On the other hand, as can be seen from the right-hand part of the figure, the distributed resource allocation mode is characterized by the transmitted signal having a non-continuous spectrum that is distributed over more or less the entire system bandwidth (time/frequency bins).

Link Adaptation Methods

Wireless systems in opposition with fixed network systems are by nature fast time-varying systems. This means that the physical channel state varies significantly over time, which makes data transfer very unreliable. For instance, in a coaxial cable or fiber optic, the level of interference is well known and only slowly changing. In wireless systems, the characteristics of the air interface change on a much quicker basis (e.g. few ns) depending on the mobile station speed, and the propagation models. In order to combat this, encoding techniques are used in order to recover from losses due to fading deeps. Although powerful codes exist, high data rates demand for further protection mechanism.

One such power control technique deployed in GSM, but implemented in particular in UMTS, relies on adapting the transmission power to the receive power. With this procedure, the transmission unit tries to compensate for fading deeps experienced by the receiver. The main drawbacks of power control techniques are that they require very fast and reliable feedback signals and tend to increase complexity of the transmission and reception units. Furthermore, bad implementation of power control algorithms may have significant impact on the overall system performance as unnecessary interference is generated.

Several link adaptation techniques exist for HSDPA (High Speed Downlink Packet Access), which is a feature that has been added in the Release 5 specifications of the UMTS standard. The aim of HSDPA is to provide means to support high data rate services in the downlink. Several new techniques have been introduced in order to meet the requirements of HSDPA.

A further adaptation technique is Adaptive Modulation and Coding (AMC), which has been introduced with HSDPA in Release 5. Instead of trying to compensate for fading deeps by varying the transmission power, the code rate and the used modulation (e.g. QPSK or 16QAM) are selected depending on channel quality feedback messages sent from the receiving unit to the transmission unit. These channel quality indicator messages (CQI) indicate the code rate the receiver unit could receive with a given probability under the same radio conditions. Should the radio conditions be poor, the receiver would recommend a small code rate, I.e. more encoding. On the other hand, when radio conditions are good, the receiver recommends a small code rate, I.e. little encoding, which enables the transmission of more data during the same period. The different levels available form a set called Modulation and Coding Set. Furthermore, it shall be well understood that the CQI messages only give information on the measured radio conditions and not on the experienced decoding quality at the receiver side.

Another adaptation technique is Node B controlled scheduling, wherein CQI messages are used by HSDPA system for the scheduling of users in a cell. Depending on the received CQIs from a population of UEs and on the scheduling algorithm used in the Node B (MAC-hs), the available physical resources are distributed among the different users. For instance, the complete set of resources can be allocated to the UE with the best CQI. This method provides the best overall system throughput in the cell, however at the cost of unfairness, as it tends to schedule only UEs that are close to the Node B and thus UEs at the cell edge would be given no service.

A further common technique for error detection and correction in packet transmission systems over unreliable channels used in HSDPA is called Hybrid Automatic Repeat reQuest (HARQ). Hybrid ARQ is a combination of Forward Error Correction (FEC) and ARQ.

If a FEC encoded packet is transmitted and the receiver fails to decode the packet correctly (errors are usually checked by Cyclic Redundancy Check bit), the receiver requests a retransmission of the packet. Depending on the information (generally code-bits/symbols), of which the transmission is composed of, and depending on how the receiver processes the information, the following HARQ schemes are defined:

Type I:
If the receiver fails to decode a packet correctly, the information of the encoded packet is discarded and a retransmission is requested. This implies that all transmissions are decoded separately. Generally, retransmissions contain identical information (code-bits/symbols) to the initial transmission.

Type II:
If the receiver fails to decode a packet correctly, a retransmission is requested, where the receiver stores the information of the erroneously received encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. Type II schemes are more sophisticated than Type I schemes, since the probability for correct reception of a packet increases with receive retransmissions. This increase comes at the cost of a required hybrid ARQ soft-buffer at the receiver.

HARQ type II can be performed in two different ways: Chase combining or incremental redundancy. In Chase combining, each retransmission repeats the first transmission or part of it. In incremental redundancy, each retransmission provides new code bits from the mother code to build a lower rate code. While Chase combining is sufficient to make Adaptive Modulation and Coding robust, incremental redundancy offers the potential for better performance with high initial and successive code rates, at higher Signal to Noise Ratio estimation error and FER operating points (i.e a greater probability that a transmission beyond the first will be needed), albeit at the cost of additional memory and decoding complexity. Another drawback of incremental redundancy is that some transmission version may not be decodable by the receiver if considered alone (non-self-decodable retransmissions). Indeed, a systematic turbo encoded data packet contains the original information bits (systematic bits) and additional parity bits (redundancy).

Type III:
This is a subset of Type II with the restriction that each transmission must be self-decodable.

The present invention is related in particular to Type II and Type III schemes, wherein the received transmissions are soft-combined.

Traditional HARQ schemes as presented above only require a single bit of feedback to the transmitter per transmission indicating a successful decoding, usually called ACK (Acknowledged), or a decoding failure, usually called NACK (Not Acknowledged). Intensive research has been done in order to further enhance the performance of an HARQ system. One research area that has been investigated is HARQ type II schemes based on received packet reliability, wherein reliability information of the received packet computed by the receiver is taken into account for shaping the retransmission of unsuccessful packets. One possible method of generating this reliability information is to compute the average magnitude of the log-likelihood ratios of the information bits at the output of the decoder. This information can be used to indicate to the transmission unit, along the NACK signal, the amount and eventually the position of the bits that should be retransmitted.

The main problem with this approach is that the amount of signaling required by such a method would be prohibitive. So as to simplify this method, instead of indicating a specific number of bits to retransmit, multiple NACK levels may be used in order to signal a level of decoding to the transmitter (e.g. 1, 2, 3). The multi level NACK messages are required to be interpreted by the transmitter side, therefore the number of levels and their exact definition of the multi level NACK messages must be known at both the receiver side and at the transmitter side. Multi level NACK messages can be either L1 messages by mapping the different levels onto the different constellation points on multilevel modulation techniques (e.g. QPSK, 16QAM) or L2 messages. In the second options, the different levels are represented by different codewords (e.g. $1^{st}$ level: 00001, $2^{nd}$ level: 00010, $3^{rd}$ level: 00100, etc.). Moreover, the reliability information can be optionally jointly encoded with other information, e.g. CQI, and the resulting encoded data can be CRC (Cyclic Redundancy Check) protected. The benefit of a L2 messages is the increase reliability of the messages. However, encoding/decoding process and CRC check are computation expensive processes with some processing delay.

A further simplification has been proposed in the form that the receiver has only in principle two levels to indicate the non-decoding of a packet (NACK and LOST), where LOST indicates a severe corruption of the received packet to such an extent that no combination with future retransmission is envisaged by the receiver. In this case, the transmitter should retransmit a self-decodable version of the packet. The benefit of this technique is its simplicity and its robustness, but the transmitter is not given any information on how to shape retransmission in case a NACK is transmitted from the receiver.

As previously mentioned, a multi level NACK feedback is beneficial since it allows the HARQ protocol transmitting entity to adjust packet re-transmissions based on the decoding quality of previously received transmissions of a data packet. This in turn improves the transmission efficiency and the overall data throughput.

However, the generation of accurate multi level NACK signals requires extensive computation at the receiving side. This tends to increase the power consumption at the receiving entity, which may be a critical issue if the receiving entity is a mobile terminal. The increase in computation requirements also tends to increase the processing delay at the receiving side, which may become a burden for services having a very tight delay requirement, such as real-time services, and may set the upper limit for the achievable data rate. Indeed, a very fast acknowledgment mechanism enables the transmitter to process more packets within a given time.

Further, a multi-level NACK feedback re-transmission protocol is by nature less reliable than a simple ACK/NACK feedback protocol, when assuming the same transmission power. Indeed, instead of having to distinguish between two values (ACK or NACK), the transmitter side has to separate several values (e.g. ACK, NACK_1, NACK_2, NACK_3). For the same transmission power of the feedback messages, the probability of a misinterpretation of the feedback levels is higher compared to a conventional ACK/NACK feedback scheme. Reliability issues are critical since a misinterpretation of a feedback message directly leads to a performance loss. Especially NACK to ACK and ACK to NACK misinterpretations are severe as they create protocol errors that need to be detected and corrected by special functions (e.g. RLC in HSDPA). Under normal circumstances, the transmission unit should be able to decode the NACK signals with a sufficiently good reliability. However, for example in case of a sudden increase of the cell interference, the multi level NACK decoding error probability increases as well.

In a similar way, UEs that are at the cell edge or UEs which are power limited due to other simultaneous uplink data traffic may not have enough power available in order to transmit the multi level NACK messages with the required power. By transmitting the feedback messages at a reduced power level, the probability of an erroneous decoding of the HARQ feedback at the Node B is increased. It should be noted that this effect applies for both means of transmitting HARQ feedback messages, i.e. L1 signals or L2 signals, although L1 signals tend to be more sensitive to this issue.

Consequently, although multi level NACK signaling brings benefits in terms of achieved system throughput, the associated drawbacks may for some services, such as real-time services or services with small packets or under some circumstances, e.g. limited transmission power, counter-balance the potential benefits.

SUMMARY OF THE INVENTION

The object of the present invention is to suggest a method for configuring an acknowledgement mode of a Hybrid Automatic Repeat ReQuest (HARQ) re-transmission protocol in order to improve the overall transmission efficiency while providing transmission robustness.

The object is solved by the subject matter of the independent claims. Advantageous embodiments of the invention are subject matter of the dependent claims.

One aspect of the invention is to make an acknowledgement mode of an HARQ re-transmission protocol configurable. A multi-level NACK acknowledgement mode or a conventional ACK/NACK acknowledgement mode may be selected depending on a Quality of Service parameter or a physical layer parameter.

One embodiment of the invention provides a method for configuring an acknowledgement mode of a HARQ re-transmission protocol used for acknowledging the delivery of data packets containing data of a service provided from a transmitting entity to a receiving entity in a wireless communication system further comprising a controlling entity in a radio access network. The method comprises configuring, by the controlling entity, based on at least one of a Quality of Service attribute or a physical layer parameter, one of a first and a second acknowledgement mode according to which the HARQ re-transmission protocol can be operated, wherein the configured acknowledgement mode is to be used by the receiving entity for acknowledging the delivery of data packets. The method further comprises transmitting a data packet from the transmitting entity to the receiving entity, receiving and decoding the data packet by the receiving entity, and transmitting an acknowledgement message according to the configured acknowledgement mode in response to the reception of said data packet by the receiving entity. In case the data packet has not been decoded successfully by the receiving entity, the acknowledgement message in the first acknowledgement mode indicates one of a plurality of decoding quality levels of the data packet obtained when decoding the data packet at the receiving entity, and, in case the data packet has not been decoded successfully by the receiving entity, the acknowledgement message in the second acknowledgement mode indicates a decoding failure of the data packet.

In a further embodiment of the invention, the controlling entity signals the configured acknowledgement mode to the transmitting entity and to the receiving entity.

In a variation of this embodiment, the controlling entity is included in the transmitting entity, the configuring step is performed by the transmitting entity, and the method further comprises signalling the configured acknowledgement mode from the transmitting entity to the receiving entity.

In yet another variation of this embodiment, the controlling entity is included in the receiving entity, the configuring step is performed by the receiving entity, and the method further comprises signalling the configured acknowledgement mode from the receiving entity to the transmitting entity.

According to a embodiment of the invention, the configured acknowledgement mode is signalled in a radio bearer configuring message exchanged during a radio bearer establishment procedure and/or radio bearer reconfiguration procedure.

According to yet another embodiment of the invention, the first acknowledgement mode is attributed to a first HARQ process and/or the second acknowledgement mode is attributed to a second HARQ process, and one of the first and second HARQ process for transmitting the service is selected based on the configured acknowledgement mode.

Further, the physical layer parameter comprises a typical data packet size used to transmit the service, and the first acknowledgement mode is configured when the typical data packet size is larger than a first predetermined value, and the second acknowledgement mode is configured when the typical data packet size is smaller than said first predetermined value.

In a particularly advantageous embodiment of the invention, the Quality of Service parameter is a bit-rate of the service provided from the transmitting entity to the receiving entity, and the first acknowledgement mode is configured when the bit-rate is larger than a second predetermined value, and the second acknowledgement mode is configured when the bit-rate is smaller than said second predetermined value.

According to a further embodiment of the method according to the invention, the first acknowledgement mode is configured, and the method further comprises switching, by the receiving entity, from the configured first acknowledgement mode to the second acknowledgement mode when a transmission power level of the receiving entity is higher than a third predetermined value, and switching back, by the receiving entity, from the second acknowledgement mode to the first acknowledgement mode when the transmission power level of the receiving entity is smaller than the third predetermined value.

Further, the method comprises signalling, by the receiving entity, the acknowledgement mode to the transmitting entity after switching from the first acknowledgement mode to the second acknowledgement mode and/or switching back from the second acknowledgement mode to the first acknowledgement mode.

According to another embodiment of the method according to the invention, the first acknowledgement mode is configured, and the method further comprises obtaining, by the transmitting entity, information on an interference level on a channel carrying the acknowledgement message. The transmitting entity may switch from the configured first acknowledgement mode to the second acknowledgement mode when the interference level obtained at the transmitting entity is larger than a fourth predetermined value, and switch back from the second acknowledgement mode to the first acknowledgement mode when the interference level obtained at the transmitting entity is smaller than the fourth predetermined value.

According to yet another embodiment of the method according to the invention, the first acknowledgement mode is configured, and the method further comprises decoding, by the transmitting entity, the acknowledgement message transmitted by the receiving entity. The transmitting entity may switch from the configured first acknowledgement mode to the second acknowledgement mode when a decoding quality of the acknowledgement message is smaller than a fifth predetermined value, and switch back from the second acknowledgement mode to the first acknowledgement mode when the decoding quality of the acknowledgement message is larger than the fifth predetermined value.

Further, the transmitting entity signals the acknowledgement mode to the receiving entity after switching from the first acknowledgement mode to the second acknowledgement mode and/or switching back from the second acknowledgement mode to the first acknowledgement mode.

According to one embodiment of the invention, the transmitting entity may be a base station within the radio access network and the receiving entity a mobile terminal. According to an alternative embodiment of the invention, the transmitting entity may be a mobile terminal and the receiving entity a base station within the radio access network. Hence, the method according to the invention provides the advantage of being applicable to both an Uplink or Downlink data packet transmission.

In a further embodiment of the invention, the physical layer parameter further comprises a Soft Handover status of the mobile terminal, and the second acknowledgement mode is configured when the mobile terminal is handed over from a first base station to a second base station during a Soft Handover.

According to another aspect of the invention, a method for configuring an acknowledgement mode of a HARQ re-transmission protocol used for acknowledging the delivery of data packets containing data of a service provided from a transmitting entity to a receiving entity in a wireless communication system further comprising a controlling entity in a radio access network is provided. The method comprises configuring, by the controlling entity, based on a radio resource allocation type used for transmission of data packets from the transmitting entity to the receiving entity one of a first and a second acknowledgement mode according to which the HARQ re-transmission protocol can be operated, wherein the configured acknowledgement mode is to be used by the receiving entity for acknowledging the delivery of data packets. Further, the method comprises transmitting a data packet from the transmitting entity to the receiving entity, receiving and decoding the data packet by the receiving entity, and transmitting an acknowledgement message according to the configured acknowledgement mode in response to the reception of said data packet by the receiving entity. In case the data packet has not been decoded successfully by the receiving entity, the acknowledgement message in the first acknowledgement mode indicates one of a plurality of decoding quality levels of the data packet obtained when decoding the data packet at the receiving entity, and, in case the data packet has not been decoded successfully by the receiving entity, the acknowledgement message in the second acknowledgement mode indicates a decoding failure of the data packet.

According to a further embodiment of the invention, the first acknowledgement mode is configured when a localized radio resource allocation type is used and the second acknowledgement mode is configured when a distributed radio resource allocation type is used.

A further embodiment of the invention provides a wireless communication system comprising a transmitting entity, a receiving entity and a controlling entity in a radio access network, wherein said wireless communication system is adapted to configure an acknowledgement mode of a HARQ re-transmission protocol used for acknowledging the delivery of data packets containing data of a service provided from the transmitting entity to the receiving entity. The controlling entity comprises configuring means for configuring, based on at least one of a Quality of Service attribute or a physical layer parameter, one of a first and a second acknowledgement mode according to which the HARQ re-transmission protocol can be operated, wherein the configured acknowledgement mode is to be used by the receiving entity for acknowledging the delivery of data packets. The transmitting entity comprises transmitting means for transmitting a data packet to the receiving entity, the receiving entity comprises receiving and decoding means for receiving and decoding the transmitted data packet, and transmitting means for transmitting an acknowledgement message according to the configured acknowledgement mode in response to the reception of said data packet by the receiving entity. In case the data packet has not been decoded successfully by the receiving entity, the acknowledgement message in the first acknowledgement mode indicates one of a plurality of decoding quality levels of the data packet obtained when decoding the data packet at the receiving entity, and, in case the data packet has not been decoded successfully by the receiving entity, the acknowledgement message in the second acknowledgement mode indicates a decoding failure of the data packet.

Another embodiment of the invention provides an alternative wireless communication system comprising a transmitting entity, a receiving entity and a controlling entity in a radio access network, wherein said wireless communication system is adapted to configure an acknowledgement mode of a HARQ re-transmission protocol used for acknowledging the delivery of data packets containing data of a service provided from the transmitting entity to the receiving entity. The controlling entity comprises configuring means for configuring, based on a radio resource allocation type used for transmission of data packets from the transmitting entity to the receiving entity, one of a first and a second acknowledgement mode according to which the HARQ re-transmission protocol can be operated, wherein the configured acknowledgement mode is to be used by the receiving entity for acknowledging the delivery of data packets. The transmitting entity comprises transmitting means for transmitting a data packet to the receiving entity, the receiving entity comprises receiving and decoding means for receiving and decoding the transmitted data packet, and transmitting means for transmitting an acknowledgement message according to the configured acknowledgement mode in response to the reception of said data packet by the receiving entity. In case the data packet has not been decoded successfully by the receiving entity, the acknowledgement message in the first acknowledgement mode indicates one of a plurality of decoding quality levels of the data packet obtained when decoding the data packet at the receiving entity, and, in case the data packet has not been decoded successfully by the receiving entity, the acknowledgement message in the second acknowledgement mode indicates a decoding failure of the data packet.

Both wireless communication systems above may comprise further means adapted to perform the method for configuring an acknowledgement mode of a HARQ re-transmission protocol according to one of the various embodiments of the invention and variations described above.

DETAILED DESCRIPTION OF THE INVENTION

Figure 1:
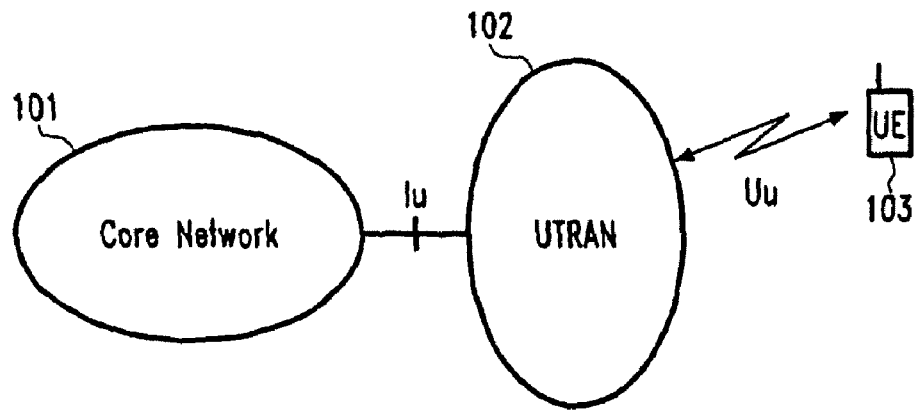
FIG. 1 shows the high-level UMTS architecture.
Figure 2:
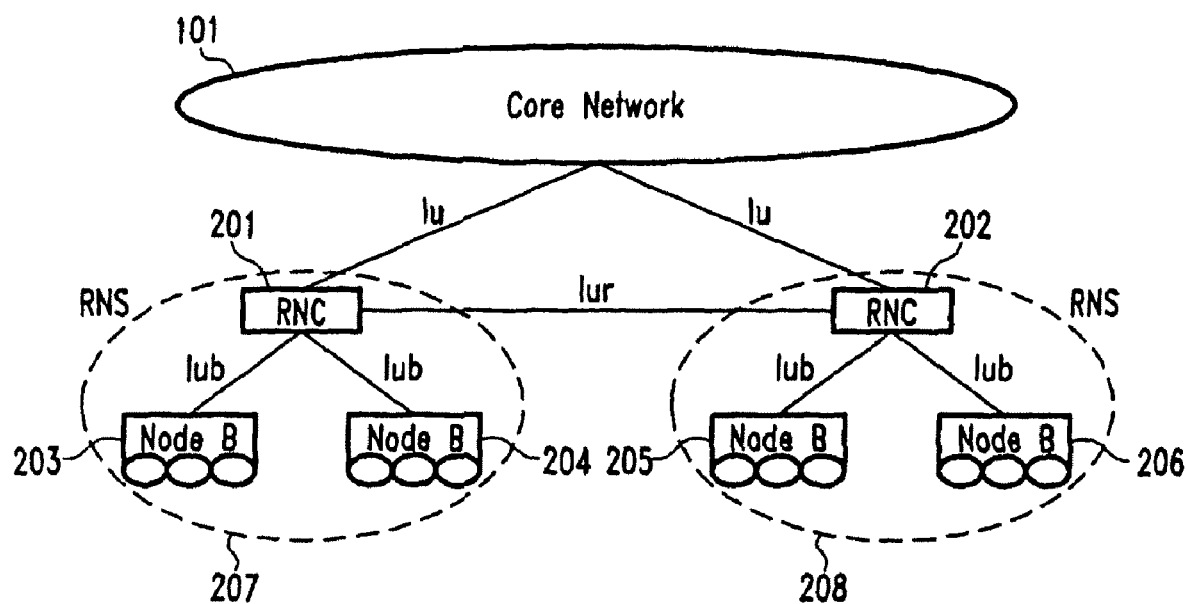
FIG. 2 shows the current architecture of the UTRAN according to UMTS Release 99/4/5.
Figure 3:
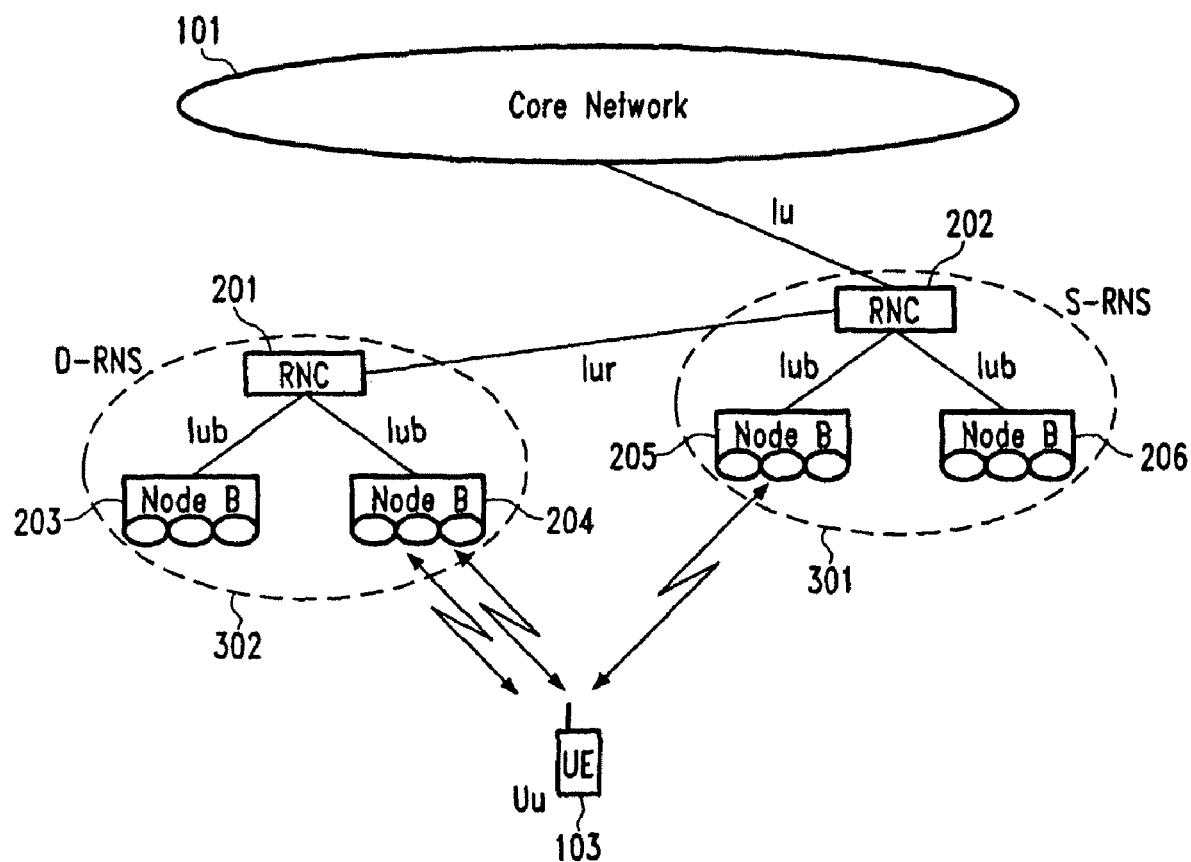
FIG. 3 shows a Drift and a Serving Radio Network Subsystem in a UMTS network.
Figure 4:
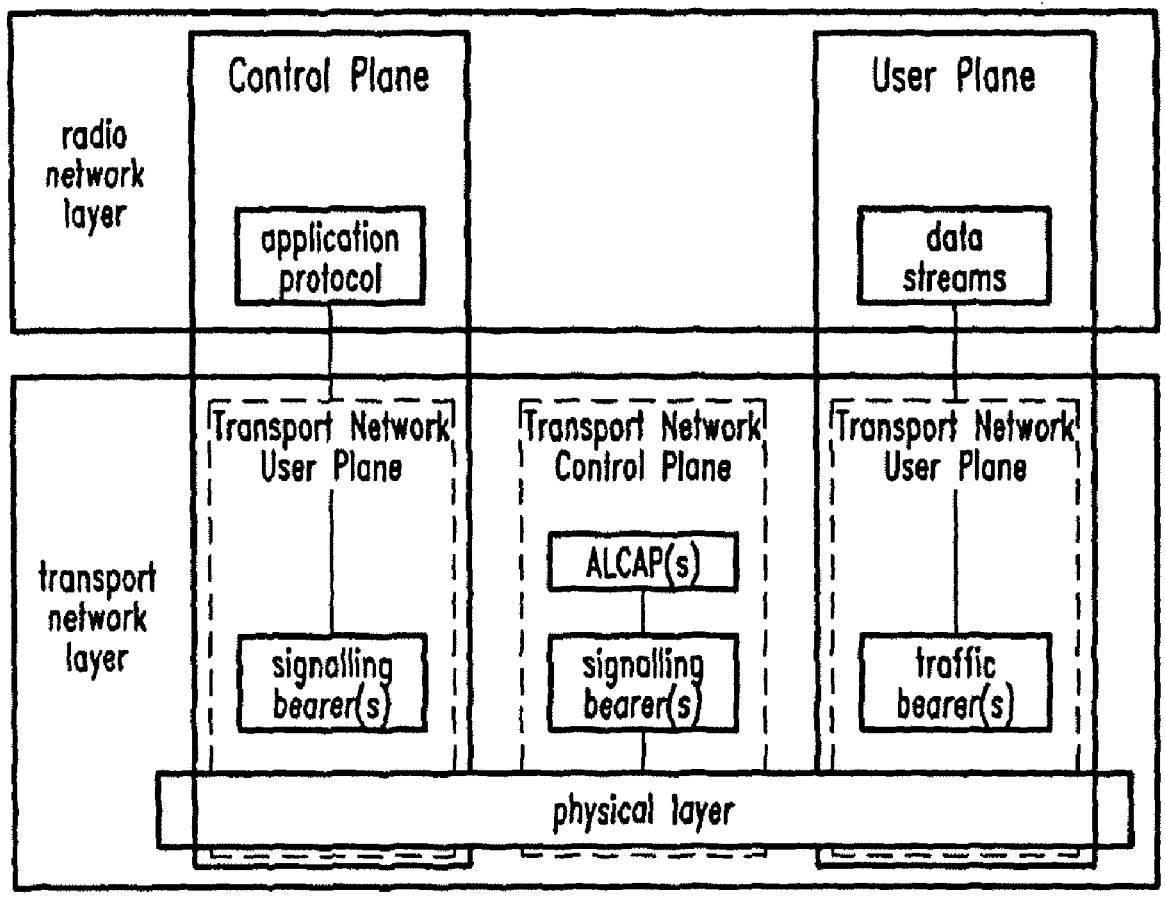
FIG. 4 shows an overview of the protocol model of the UTRAN in an UMTS network.
Figure 5:
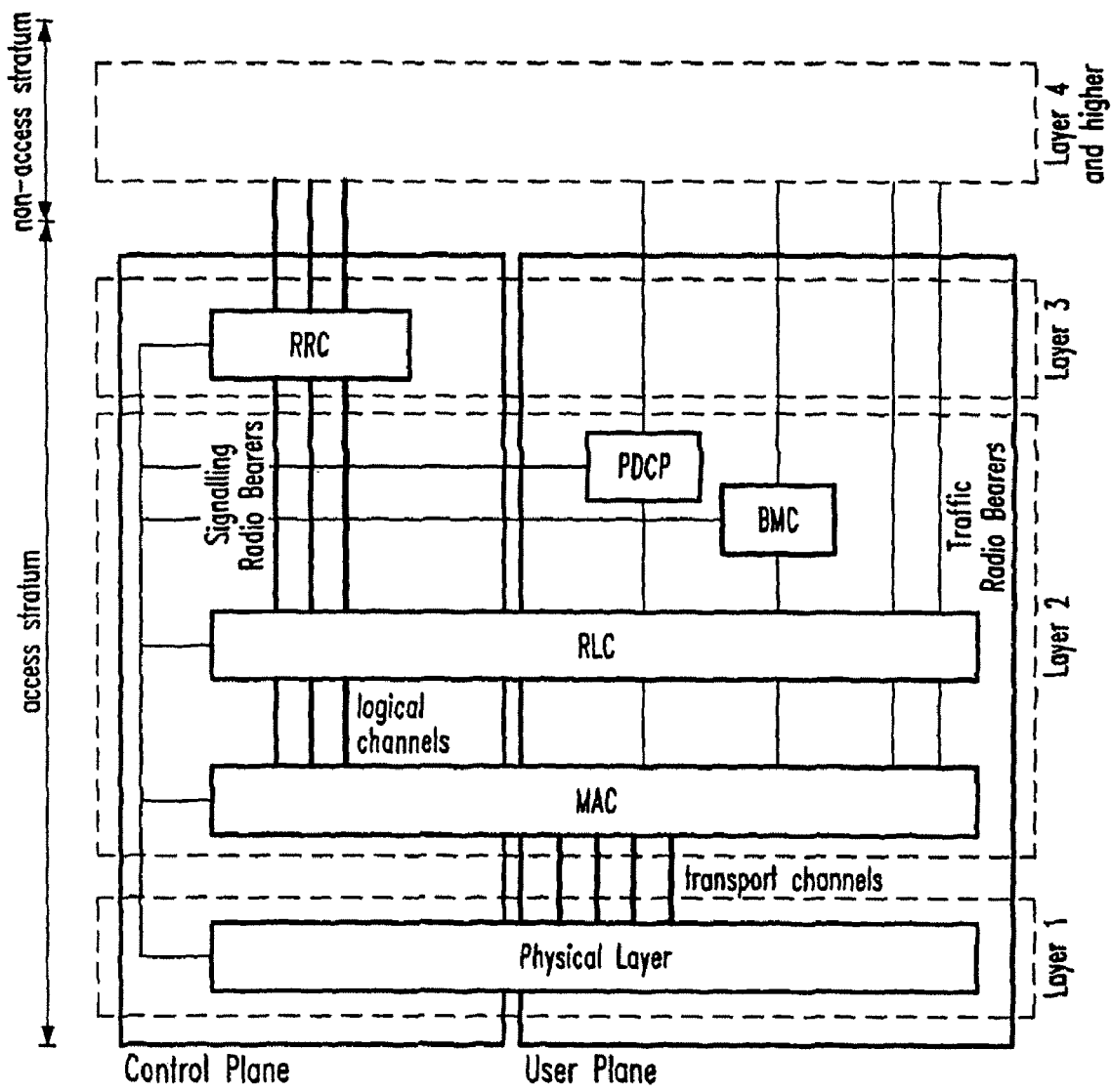
FIG. 5 shows an overview of the radio interface protocol architecture of the UTRAN.
Figure 6:
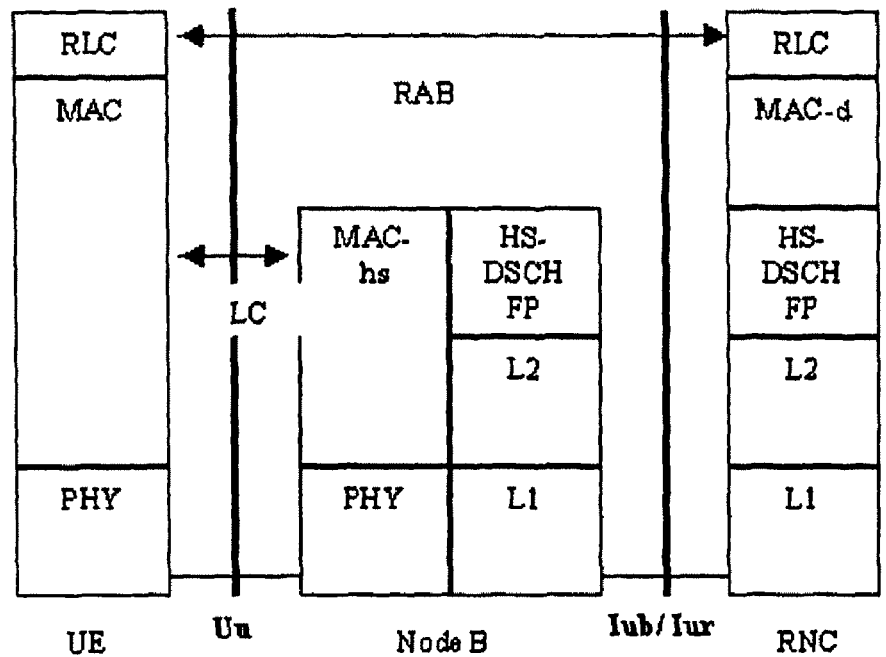
FIG. 6 shows a User Plane Protocol Stack Architecture for HSDPA assuming a Release 99/4/5 UTRAN architecture.
Figure 7:
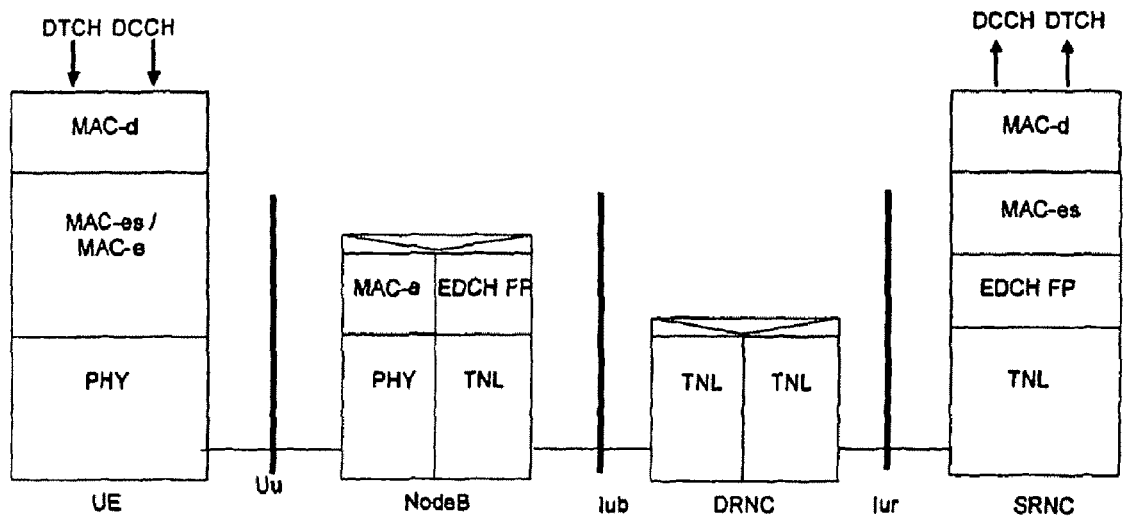
FIG. 7 shows a User Plane protocol stack architecture for HSUPA assuming a Release 99/4/5 UTRAN architecture.
Figure 8A:
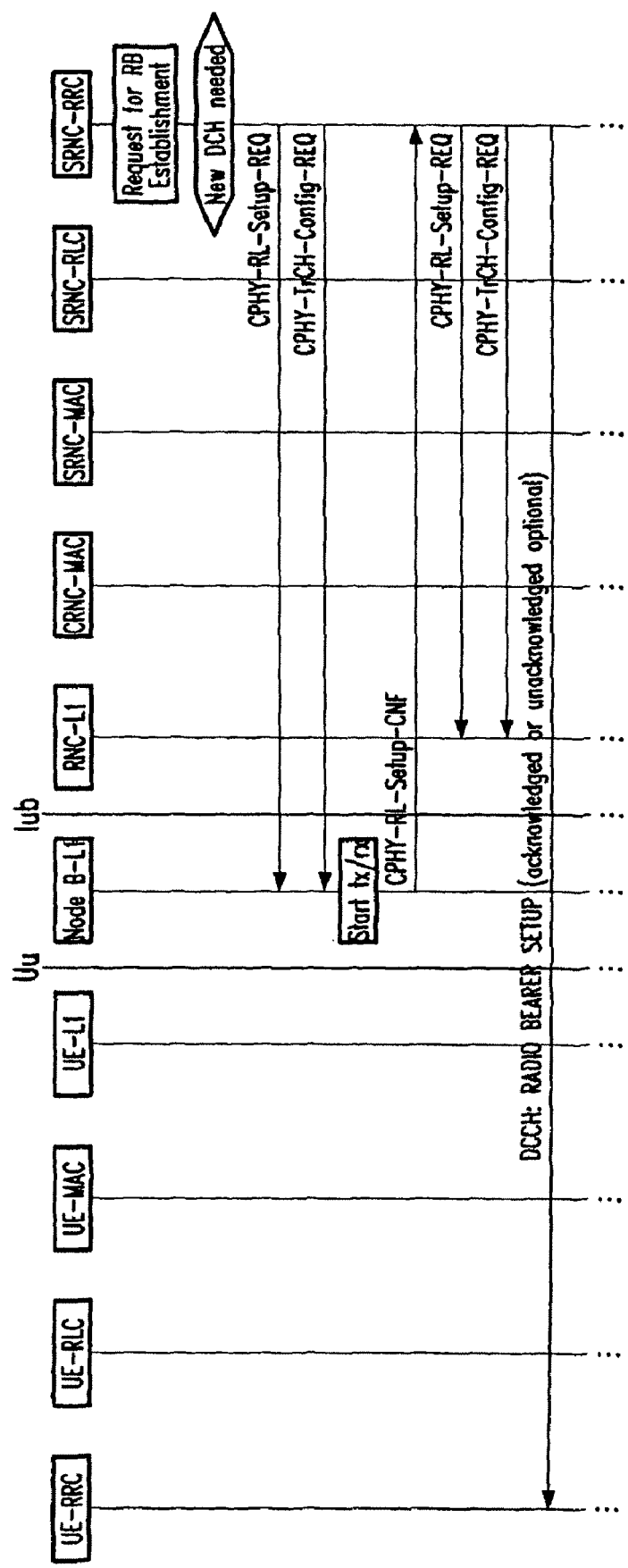
FIG. 8 shows a radio bearer establishment procedure with dedicated physical channel activation in a UMTS system.
Figure 8B:
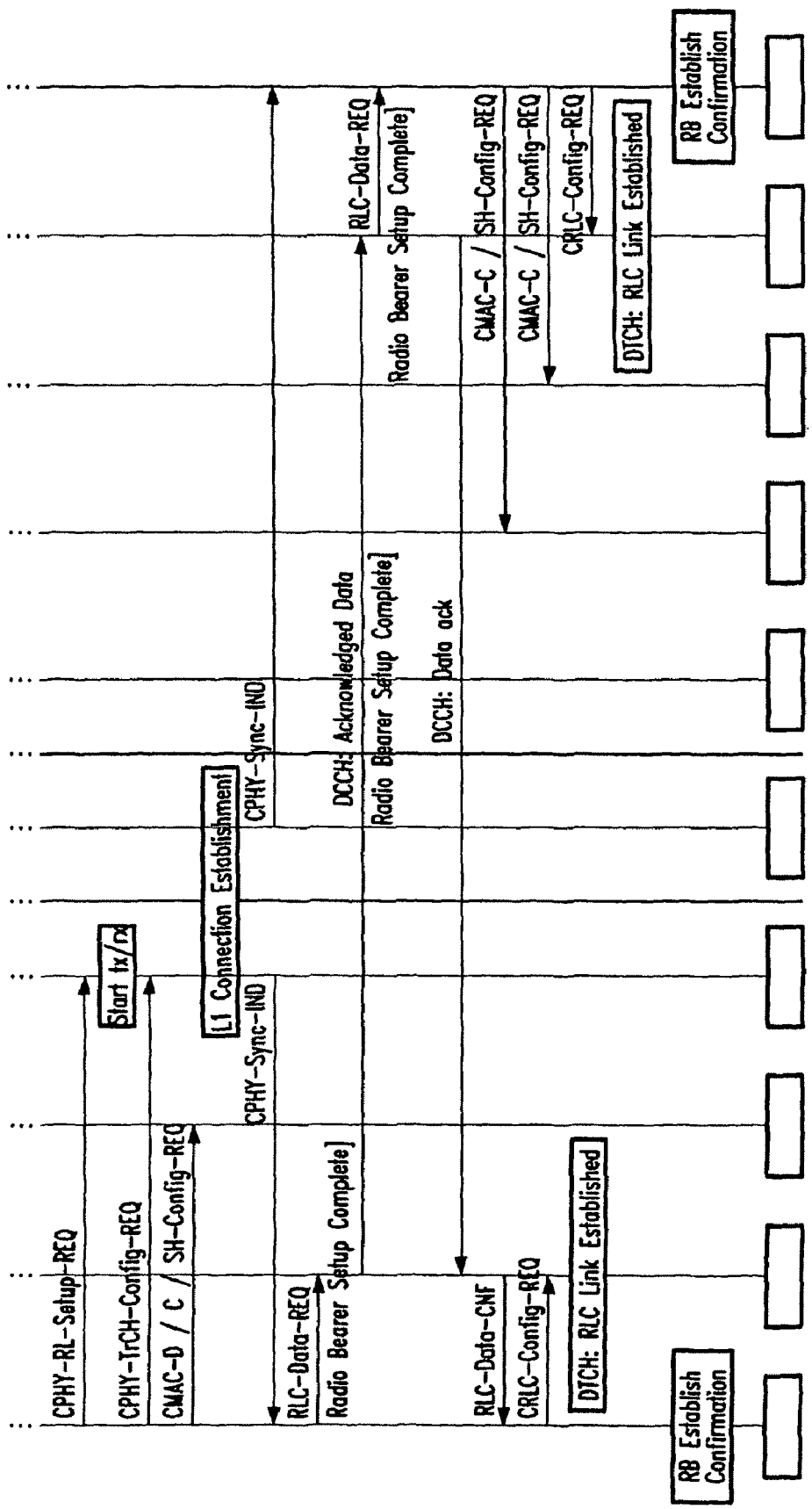
Figure 9:
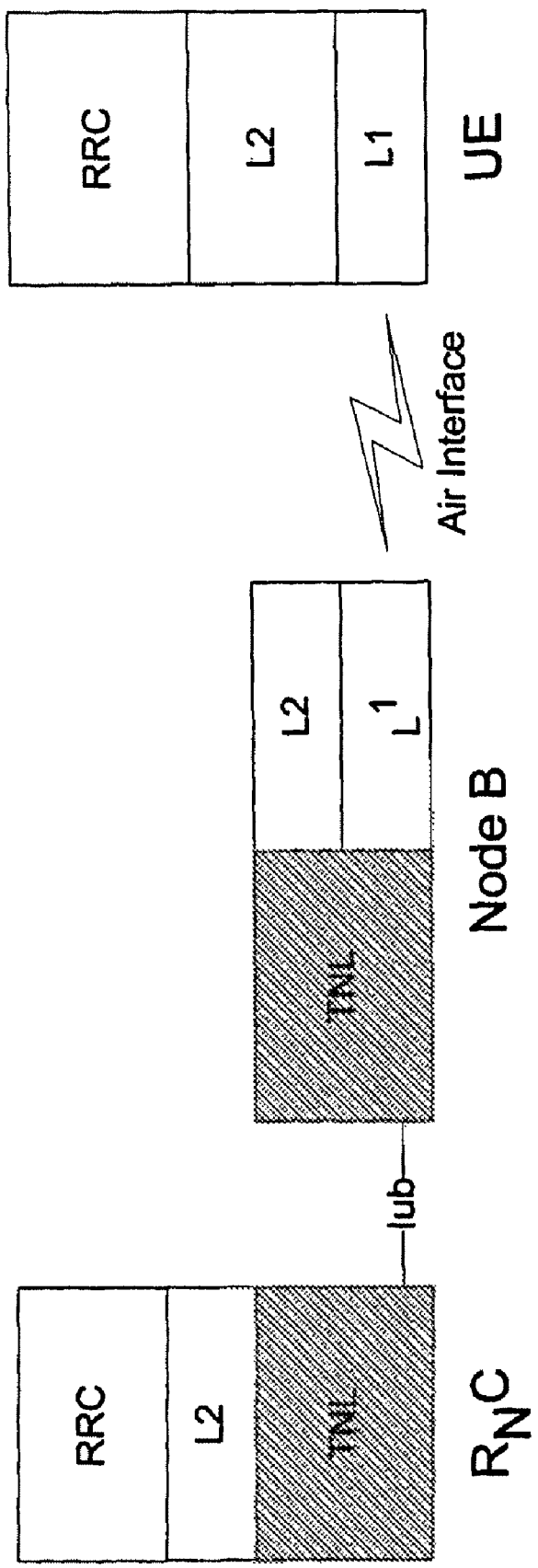
FIG. 9 shows a Control Plane protocol stack example with RNC element assuming a Release 6 UMTS architecture.
Figure 10:
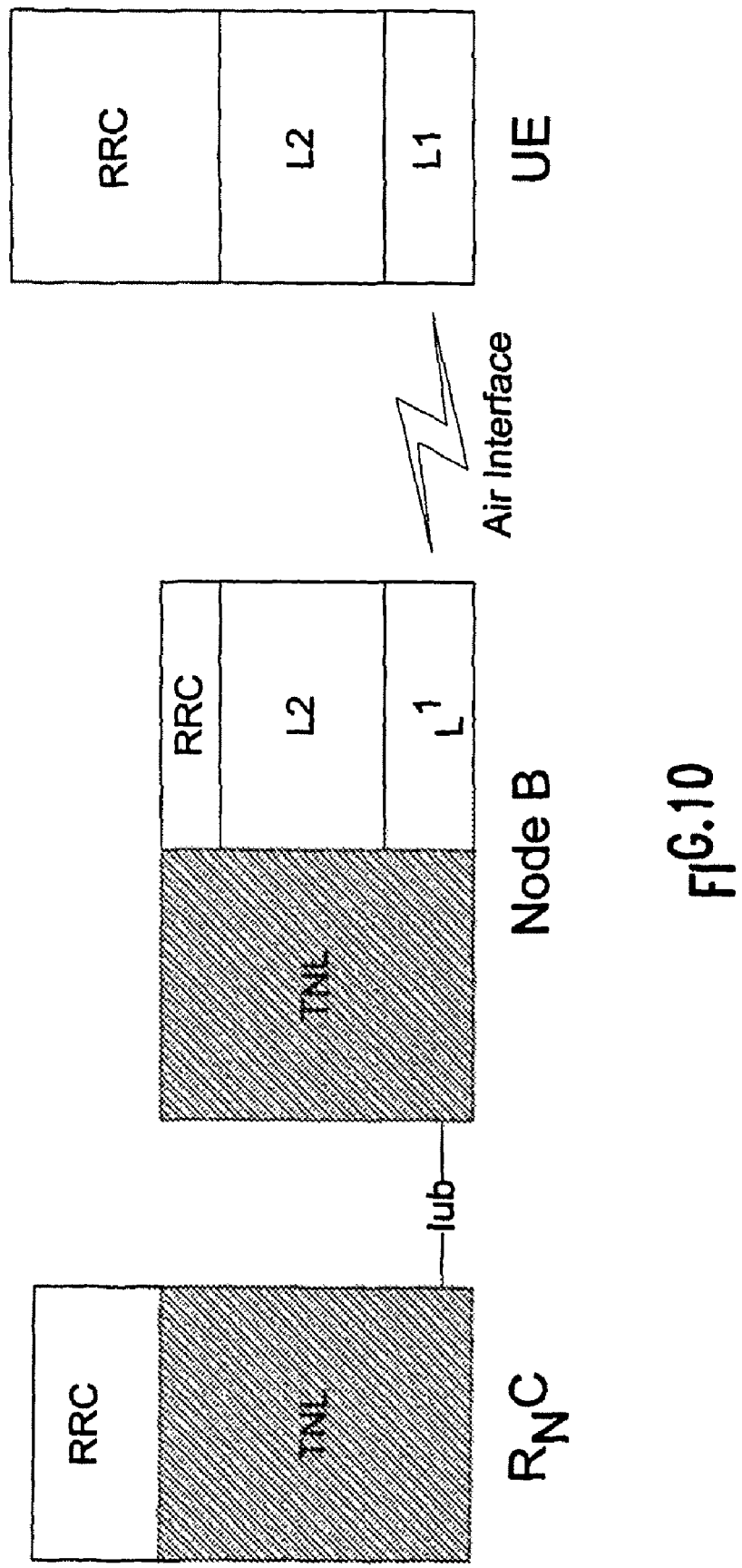
FIG. 10 shows an evolved Control Plane protocol stack example with RNC element.
Figure 11:
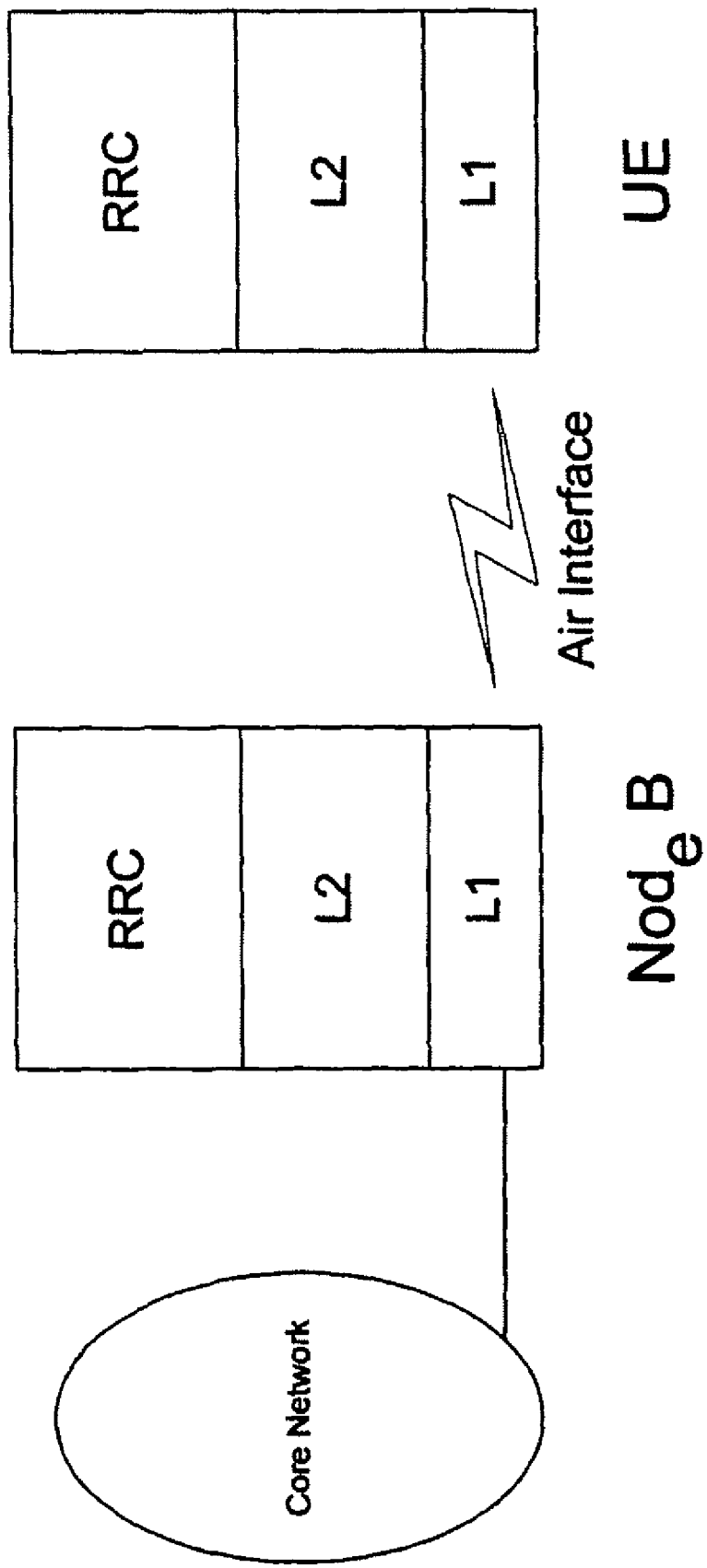
FIG. 11 shows an evolved Control Plane protocol stack example without RNC element.
Figure 12:
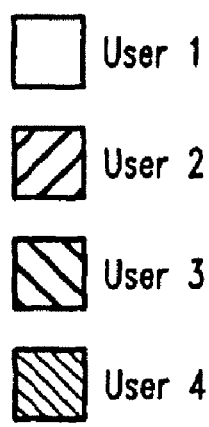
FIG. 12 shows a localized and distributed resource allocation method in OFDM.
Figure 12:
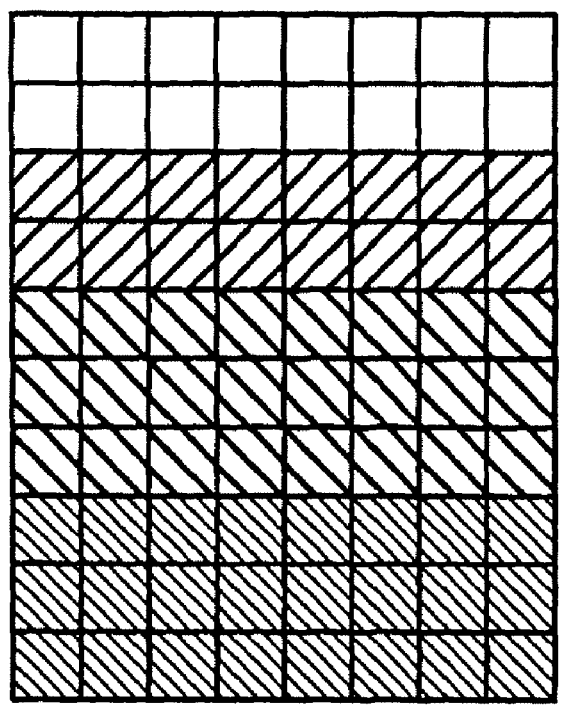
Figure 12:
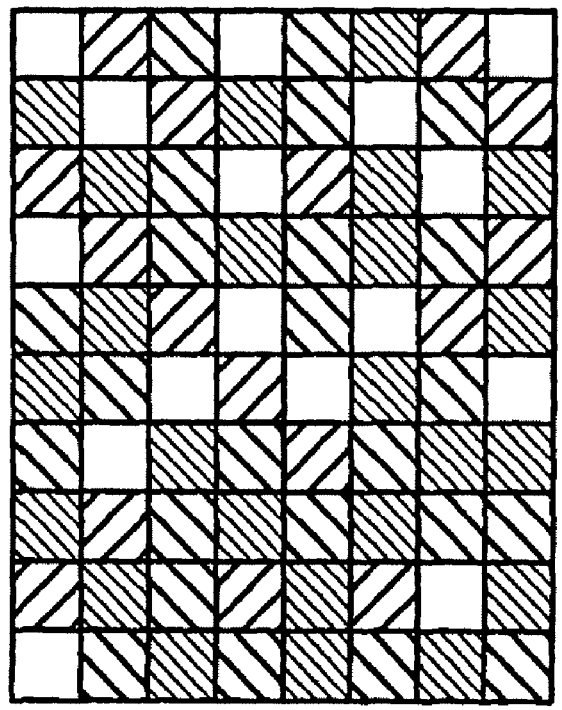

The following paragraphs will describe various embodiments of the invention. For exemplary purposes only, most of the embodiments are outlined in relation to a UMTS communication system and the terminology used in the subsequent sections mainly relates to the UMTS terminology, as the invention may be advantageously used in this type of communication network. However, the terminology used and the description of the embodiments with respect to a UMTS architecture is not intended to limit the principles and ideas of the inventions to such systems.

Also the detailed explanations given in the Technical Background section above are intended to better understand the mostly UMTS specific exemplary embodiments described in the following and should not be understood as limiting general ideas underlying the invention to the described specific implementations of processes and functions in the mobile communication network.

In particular, even though the legacy UTRAN Release 5/6 architecture has been described in detail, it should be noted that the present invention is not limited to this legacy architecture but is also applicable to future evolutions of the UTRAN, which will be described further below.

One aspect of the invention is the configuration of the acknowledgement mode of an HARQ re-transmission protocol per radio bearer. Alternatively, this configuration of the acknowledgement mode may be performed per HARQ process, i.e. a feedback mode is associated to a corresponding HARQ process. A combination of these configuration modes is also possible. The configuration is thereby based on a physical layer parameter or a QoS attribute.

According to another aspect of the invention, an acknowledgement mode of an HARQ re-transmission protocol is configurable, i.e. a multi-level NACK feedback mode or a conventional ACK/NACK feedback mode is selected, e.g. based on a data packet size, a Quality of Service parameter, such as a data bit-rate, a Soft Handover status of a mobile terminal or a resource allocation mode used for communication in a radio access network.

According to yet another aspect of the invention, a transmitting entity and/or receiving entity may switch from the configured feedback mode to another feedback mode depending on e.g. a transmission power level of the receiving entity, an interference level on the channel carrying the acknowledgement message or a decoding quality of the acknowledgement message at the transmitting entity.

A transmitting entity and a receiving entity of a wireless communication system are considered. The transmitting entity transmits data packets of a service to the receiving entity. The receiving entity receives and decodes the data packets of the service. In response to the reception of the data packets, and after decoding the received data packets, the receiving entity acknowledges the reception of the data packets by sending an acknowledgement message to the transmitting entity. The receiving entity employs a HARQ re-transmission protocol to acknowledge the delivery of data packets of the service provided from the transmitting entity to the receiving entity. The wireless communication system further comprises a controlling entity in a radio access network.

According to an embodiment of the invention, an acknowledgement mode of the HARQ retransmission protocol used for acknowledging the delivery of data packets of the service provided from the transmitting entity to the receiving entity can be made configurable. The controlling entity configures, based on at least one of a Quality of Service attribute or a physical layer parameter, one of a first and a second acknowledgement mode according to which the HARQ re-transmission protocol can be operated, wherein the configured acknowledgement mode is to be used by the receiving entity for acknowledging the delivery of data packets.

The acknowledgement message transmitted by the receiving entity to the transmitting entity is generated according to the configured acknowledgement mode. In particular, when the data packet is decoded successfully by the receiving entity, a positive acknowledgement message ACK is sent by the receiving entity to the transmitting entity, thus confirming the reception of the transmitted data packet and the success of the decoding process of the data packet by the receiving entity.

However, in case the data packet has not been decoded successfully by the receiving entity, an acknowledgement message is sent by the receiving entity to the transmitting entity, wherein the acknowledgement message is generated according to the configured acknowledgement mode. In a first acknowledgement mode, an acknowledgement message indicating one of a plurality of decoding quality levels of the data packet obtained when decoding the data packet at the receiving entity, is sent by the receiving entity to the transmitting entity. In a second acknowledgement mode, when the data packet has not been decoded successfully by the receiving entity, an acknowledgement message indicating a decoding failure of the data packet, e.g. a negative acknowledgement NACK, is sent by the receiving entity to the transmitting entity.

The controlling entity can reside in any network element comprised within the radio access network of the wireless communication system. Typically, the controlling entity is the entity terminating the Radio Resource Control (RRC) in the radio access network, e.g. the RNC in present UMTS systems. When the controlling entity has configured one of the first and second acknowledgement mode based on a Quality of Service attribute or a physical layer parameter, it signals the configured acknowledgement mode to the transmitting entity, so that the transmitting entity is aware of the configured acknowledgement mode used for acknowledging the delivery of data packets at the receiving entity. In case the transmitting entity is a base station, or in UMTS a Node B, and the receiving entity is a mobile terminal, i.e. in UMTS a UE, the controlling entity may reside in the RNC and signals the configured acknowledgment mode to the Node B using NBAP signaling. Moreover, the controlling entity also signals the configured acknowledgement mode to the UE using RRC signaling. Consequently, both the transmitting entity and receiving entity are aware of the configured acknowledgement mode to be used for acknowledging the delivery of data packets containing data of the service provided from the transmitting entity to the receiving entity.

The example mentioned above can also be applied to the case where the transmitting entity is a mobile terminal and the receiving entity is a base station.

In another embodiment of the present invention, the controlling entity is foreseen in the transmitting entity, so that the configuration of the acknowledgement mode of the HARQ re-transmission protocol is performed by the transmitting entity. Further, the transmitting entity signals the configured acknowledgement mode to the receiving entity, so that the receiving entity knows which one of the first or second acknowledgement mode is to be used for acknowledging delivery of data packets transmitted by the transmitting entity.

In an alternative embodiment of the present invention, the controlling entity is located in the receiving entity, so that the configuration of the acknowledgement mode of the HARQ re-transmission protocol is thus performed by the receiving entity. After configuring the acknowledgement mode, the receiving entity signals the configured acknowledgement mode to the transmitting entity, so that the transmitting entity is aware of the configured acknowledgement mode.

The configuration of one of a first and a second acknowledgement mode according to which the HARQ re-transmission protocol can be operated is performed based on at least one of a Quality of Service attribute or a physical layer parameter.

A Quality of Service attribute as used herein is for example a bit-rate of the service provided from the transmitting entity to the receiving entity. More generally, the term may be any parameter which characterizes a service, such as a maximum allowable delay for e.g. delay-critical services, or a data rate, respectively, bit-rate of the service of interest.

The term physical layer parameter defines a parameter that is known to the physical layer. A physical layer parameter is for example the data packet size used in a transport block. The data packet size is known to the physical layer since it is determined by the MAC layer and communicated to the physical layer. This data packet size will be defined in the present application as a typical data packet size, since the MAC layer is adapted to vary the size of a data packet used in a transport block depending on the channel quality. In a channel with a high quality, large data packets may be sent, whereas when the channel quality is low, it is more advisable to transmit data packets having a smaller packet size. Another example for a physical layer parameter may also be the Soft Handover status of a UE, i.e. whether the UE is undergoing a Soft Handover or not.

The receiving entity can be either configured to signal conventional ACK/NACK feedback or Multi-level ACK/NACK feedback in order to enable the transmitting entity to adjust the retransmissions of a data packet based on the decoding quality of previously received transmissions of that data packet.

The configuration of the feedback mode depending on the service characteristics can be done on different levels of abstraction as will be described in the following.

According to one embodiment of the invention, the HARQ feedback mode is configured per radio bearer.

Before starting data transmission, a radio bearer is established and all layers are configured accordingly. Typically, a radio bearer establishment procedure is used to establish new radio bearers. Based on a Quality of Service (QoS) attribute of an application/service, the RRC entity determines the radio bearer parameters that are most appropriate for carrying data of the application/service.

Depending on the service type, it might be either more or less beneficial to use a reliability-based HARQ re-transmission protocol with a multi-level feedback mode. For a service using a high data-rate and utilizing data packets with large packet sizes, it is advantageous to perform the re-transmission of a data packet using a multi-level acknowledgement mode. Hence, multi-level feedback may improve the transmission efficiency significantly in this case.

However, for other services like delay-critical services or low data rate services, e.g. VoIP, the use of a multi-level feedback mode for acknowledging the delivery of data packets may not be exploited in order to improve the throughput. In that case, it may be more beneficial to use an ordinary ACK/NACK feedback mode. Further, since additional signaling overhead is involved by a multi-level ACK/NACK acknowledgement mode, and the feedback signaling reliability is reduced, a multi-level NACK feedback mode appears less adapted than a conventional ACK/NACK feedback mode.

Depending on the considered service and corresponding QoS attribute, the controlling entity, may set the HARQ feedback mode. The feedback mode may be signaled in a radio bearer configuring message, which may e.g. be sent during the radio bearer establishment procedure. The controlling entity, e.g. the RRC entity, may inform the UE about the configured HARQ acknowledgement mode within e.g. a RADIO BEARER SETUP message. Since both transmitting and receiving entity need to know the feedback mode associated to a radio bearer, the RRC entity also indicates the feedback mode to the Node B via NBAP signaling, i.e. using a Radio Link Configuration message.

Since radio bearer properties may be changed in the course of an active connection, a radio bearer reconfiguration procedure may be used to reconfigure radio bearer parameters. Therefore, a configured feedback mode may be reconfigured according to an embodiment of the invention. E.g. the RRC entity may signal the reconfigured feedback mode to the UE and Node B within a radio bearer reconfiguration procedure (RRC message) or a radio link reconfiguration procedure (NBAP message).

In case data of two radio bearers having a different feedback mode set thereto are transmitted in a same HARQ process, it may be considered to prevent the multiplexing of radio bearers having different HARQ acknowledgement modes on the same HARQ process. In an exemplary implementation, the RRC entity defines a multiplexing list, indicating which radio bearers may have data packets that may be multiplexed in the same transport block, that is associated to the corresponding HARQ process.

Figure 13:
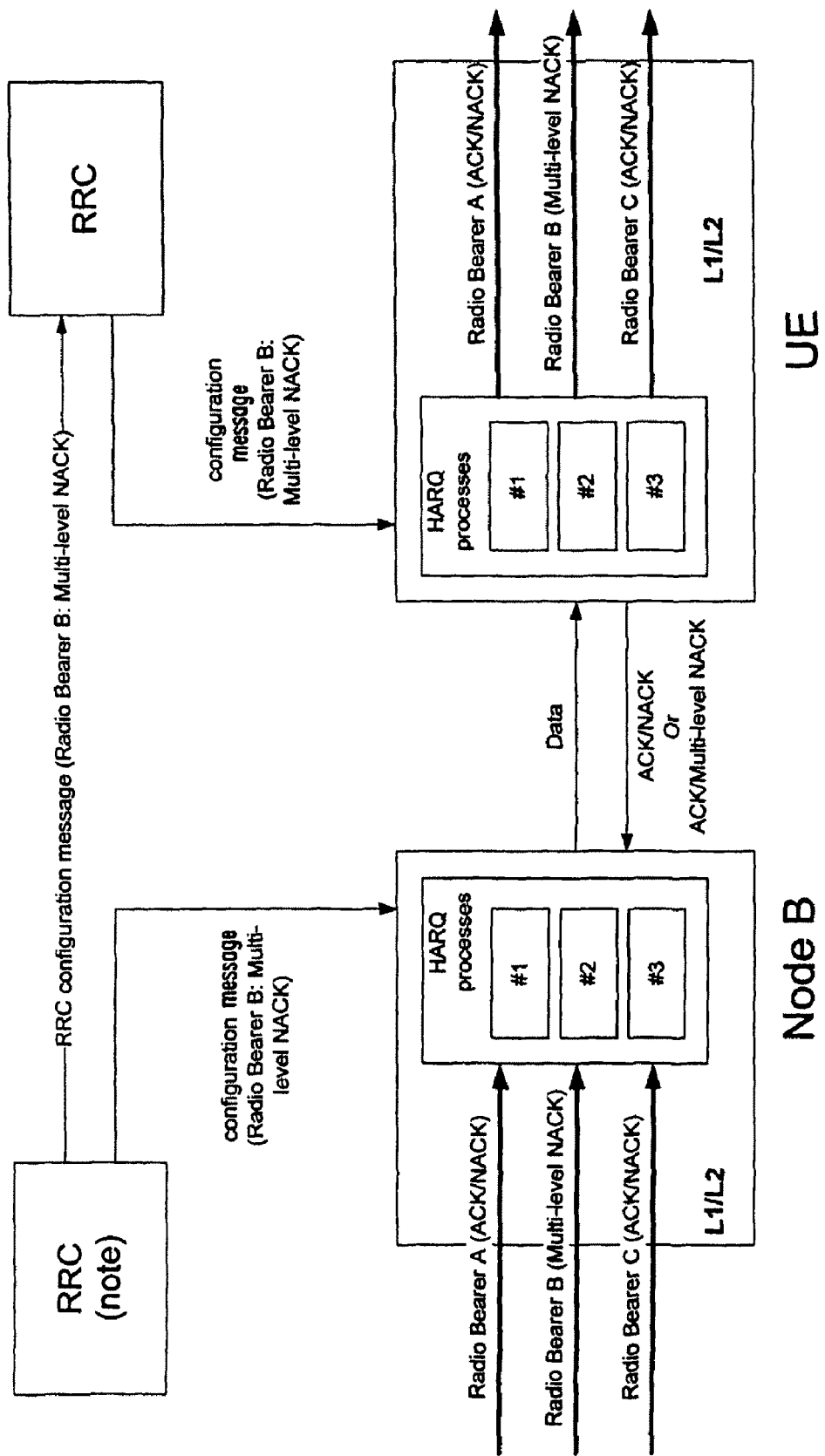
FIG. 13 shows a configuration of an HARQ acknowledgement mode per radio bearer according to an embodiment of the present invention.

A configuration of an acknowledgement mode per radio bearer is illustrated in FIG. 13. The transmitting entity is chosen to reside in a Node B and the receiving entity is included in a User Equipment UE. The controlling entity transmits a configuration message to the transmitting entity indicating the allocation of the acknowledgement mode to the radio bearers. The controlling entity also communicates this allocation information to the receiving entity in a configuration message. In the example illustrated in FIG. 13, a multi-level NACK feedback mode is allocated, for instance, to radio bearer B. In contrast, a conventional ACK/NACK acknowledgement mode is allocated to radio bearers A and C.

The transmitting entity, residing in the present case in the Node B, transmits data to the receiving entity and the receiving entity, residing in the present case in the UE, sends a feedback message to the Node B depending on the configured acknowledgement mode allocated to a radio bearer. For example, data transmitted by radio bearer A or C is acknowledged using a conventional ACK/NACK feedback mode, whereas data transmitted by radio bearer B is acknowledged using a multi-level NACK feedback mode.

Even though the controlling entity is represented as an independent functional entity which is distinct from the transmitting entity and receiving entity, the controlling entity may also be comprised within either the transmitting entity or the receiving entity, according to another embodiment of the invention. In the case where the controlling entity is comprised in the transmitting entity, the transmitting entity signals to the receiving entity the allocation of the acknowledgement mode to the radio bearers. Alternatively, the controlling entity may also be comprised in a separate network element of the radio access network, e.g. the RNC.

According to a further embodiment of the invention, a HARQ feedback mode may be configured per HARQ process.

Figure 14:
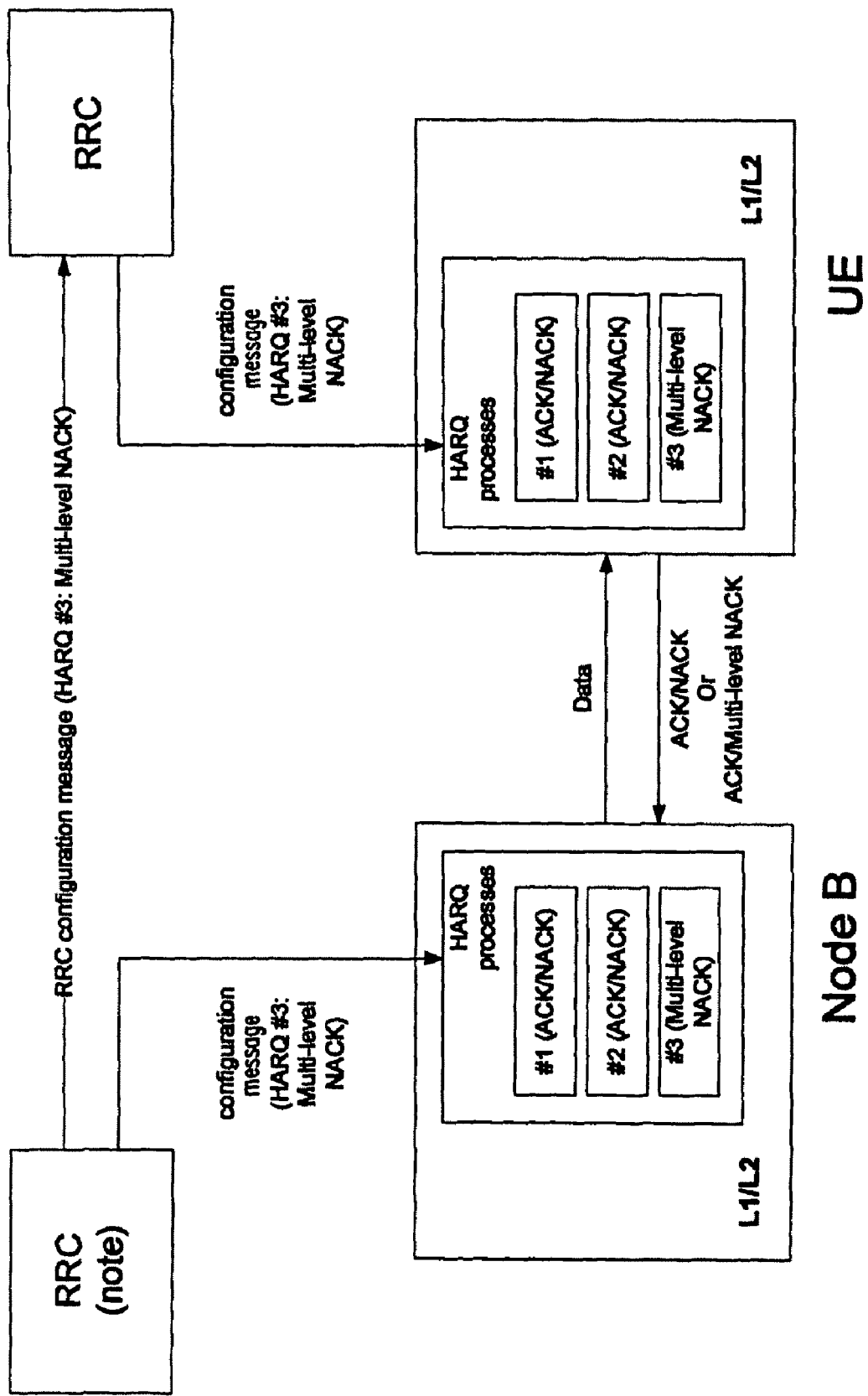
FIG. 14 shows a configuration of an HARQ acknowledgement mode per HARQ process according to an embodiment of the present invention.

FIG. 14 shows an exemplary situation where the controlling entity terminates RRC and resides in a network element that is different from the Node B and UE. The transmitting entity is comprised in the Node B and the receiving entity is located in a UE. The controlling entity attributes an acknowledgement mode to a HARQ process and signals to the transmitting entity the allocation of the acknowledgment mode to the HARQ processes in a configuration message. Further, the controlling entity communicates this allocation information to the receiving entity using a configuration message.

The first acknowledgement mode, e.g. a multi-level NACK feedback mode, is allocated to a first HARQ process and the second acknowledgement mode, e.g. a conventional ACK/NACK acknowledgement mode, is allocated to a second HARQ process. Alternatively, a single acknowledgement mode may be attributed to all the HARQ processes.

In the example shown in FIG. 14, the conventional ACK/NACK acknowledgement mode is allocated to the HARQ processes #1 and #2, while the multi-level NACK acknowledgement mode is allocated to the HARQ process #3. For data transmitted from the transmitting entity to the receiving entity and whose reception is acknowledged according to the HARQ process #1 and #2, the acknowledgement message transmitted by the receiving entity is generated using a conventional ACK/NACK feedback mode. On the other hand, for data transmitted from the transmitting entity to the receiving entity and whose reception is acknowledged according to the HARQ process #3, the acknowledgement message transmitted by the receiving entity is generated using a multi-level NACK feedback mode.

Even though the RRC entity is represented in this embodiment as a separate entity that resides in a network element different from the transmitting entity and receiving entity, according to another embodiment of the present invention, the controlling entity may be included in the transmitting entity or receiving entity. In the case where the controlling entity is included in the transmitting entity, e.g. in the Node B, the Node B signals the allocation information to the receiving entity, i.e. the UE in this case, so that the UE is aware of the acknowledgement mode associated to each HARQ process.

Configuring an HARQ acknowledgement mode per HARQ process may be more advantageous than a configuration of the acknowledgement mode per radio bearer. Indeed, certain HARQ processes could make use of multi-level feedback, whereas for transmission on other HARQ processes a conventional ACK/NACK feedback is configured. Since the HARQ process used for a data transmission is known by the receiving entity, either by explicit signaling of the HARQ process ID, as e.g. in HSDPA, or by the transmission timing, as e.g. in HSUPA, the feedback mode is also known and the receiving entity can thus generate the correct type of feedback. Depending on the QoS attributes of the service, the RRC entity configures the HARQ feedback mode of each HARQ process individually and may set some HARQ process with a multi-level NACK feedback mode as can be shown in FIG. 14.

Moreover, the RRC entity may explicitly set the mapping of radio bearers onto HARQ processes. Since the mapping needs to be known by both the transmitting and receiving entity, the RRC entity informs the UE and Node B on the mapping e.g. via RRC and NBAP signaling, respectively. In case the controlling entity resides in a network element that is distinct from the respective network elements including the transmitting and receiving entity, this may require the addition of new information elements in the relevant RRC and NBAP messages.

According to another embodiment of the invention, an HARQ feedback mode is configured based on a Soft Handover status of an User Equipment.

The second acknowledgement mode, i.e. the conventional ACK/NACK acknowledgement mode, is configured when the mobile terminal is handed over from a first base station to a second base station during a Soft Handover.

Since the information given by a multi-level HARQ feedback can be best exploited for high-data rate transmissions, a reliability-based HARQ re-transmission protocol using a multi-level feedback mode is most suited for the situation in which the UE is not in a Soft Handover. Since the user data rate in Soft Handover is expected to be less than in cell border, the feedback mode according to an embodiment of the present invention is set based on the Soft Handover status of a user. Since both transmitting and receiving entity are aware of the Soft Handover status of a User Equipment, both entities thus know the feedback mode to be used for a re-transmission.

According to another aspect of the present invention, the HARQ feedback mode may be configured based on the resource allocation method used in the radio access network.

The controlling entity configures, based on a radio resource allocation type used for transmission of data packets from a transmitting entity to a receiving entity, one of a first and a second acknowledgement mode according to which the HARQ re-transmission protocol can be operated.

In case a data packet has not been decoded successfully, the acknowledgement message sent by the receiving entity according to a first acknowledgement mode indicates one of a plurality of decoding quality levels of the data packet obtained when decoding the data packet at the receiving entity. According to a second acknowledgement mode, in case the data packet has not been decoded successfully by the receiving entity, the acknowledgement message in the second acknowledgement mode indicates a decoding failure of the data packet.

In an embodiment of the present invention, the first acknowledgement mode, the multi-level NACK acknowledgement mode, is configured when a localized radio resource allocation type, as defined for OFDM radio access networks in the Background of Invention section, is used for transmission of data packets from a transmitting entity to a receiving entity. On the other hand, when a distributed radio resource allocation type, as also defined for OFDM radio access networks in the Background of Invention section, is used for the transmission of data packets, the second acknowledgement mode, the conventional ACK/NACK feedback mode, is configured.

Since the localized resource allocation method tries to benefit from the frequency scheduling gain by using a very precise link adaptation, such as CQI reporting, it is best suited for the multi-level NACK feedback mode, since this feedback mode also tries to improve the transmission efficiency by adjusting re-transmissions based on the received HARQ feedback.

On the other hand, the distributed resource allocation type relies on the frequency diversity effect to achieve transmission robustness. In contrast to the localized resource allocation type, the distributed resource allocation mode does not try to allocate the physical resources based on a quality feedback from the receiving entity, as for example CQI reporting. Since the transmitting entity does not exploit information that may be provided by a multi-level feedback mode, a conventional ACK/NACK feedback mode is configured for the distributed resource allocation mode.

Both resource allocation methods mentioned above, the localized and distributed resource allocation methods, can also be referred to as scheduling modes. The localized and distributed scheduling modes can be employed in a multicarrier based radio access scheme, e.g. OFDM, as described in the Background of Invention section, as well as in a single-carrier based radio access scheme, such as Single-Carrier Frequency Division Multiple Access (SC-FDMA). Therefore, the configuration of the HARQ feedback mode based on the resource allocation method, e.g. scheduling mode, according to this aspect of the invention, is not limited to a specific radio access technology.

As in the mechanisms described in the embodiments above, the configured acknowledgement mode of the HARQ re-transmission protocol may be signaled using a radio bearer message and/or may be attributed to a specific HARQ process.

According to another embodiment of the invention, the transmitting or receiving entity may autonomously switch the configured acknowledgement mode. When the first acknowledgement mode is configured, the transmitting entity or receiving entity may switch from the configured first acknowledgement mode to the second acknowledgement mode autonomously in some situations.

For example, when a transmission power level of the receiving entity is higher than a predetermined value, i.e. the receiving entity is transmission power limited, the receiving entity switches from the configured first acknowledgement mode, i.e. the multi-level feedback mode, to the second acknowledgement mode, i.e. the conventional ACK/NACK feedback mode. Accordingly, when the transmission power level of the receiving entity is smaller than the predetermined value, the receiving entity switches back from the second acknowledgement mode to the configured first acknowledgement mode.

The receiving entity also informs the transmitting entity about this switching or switching back from one acknowledgement mode to the other acknowledgement mode by signaling the acknowledgement mode to the transmitting entity after switching from the first acknowledgement mode to the second acknowledgement mode, and switching back from the second acknowledgement mode to the first acknowledgement mode.

The feedback signaling according to a multi-level feedback mode requires more transmission power compared to a conventional ACK/NACK feedback signaling assuming the same signaling reliability, or, in other words, the signaling reliability of multi-level feedback signaling is less compared to conventional ACK/NACK feedback signaling assuming the same transmission power. Consequently, it is more beneficial to switch from a multi-level feedback mode to conventional ACK/NACK feedback mode in such a transmission power limited situation, even when the multi-level feedback mode was previously configured by the RRC entity.

Hence, according to an embodiment of the invention, when a UE is power limited, the UE autonomously switches from the configured multi-level feedback mode to the conventional ACK/NACK feedback mode. Once the power limitation does not exist anymore, the UE can revert to the configured feedback mode. Even though the power limitation situation is described in detail, there might be other situations where the UE autonomously switches the configured feedback mode autonomously.

In the same way as the UE can autonomously override the configured feedback mode, the Node B also switches the acknowledgement mode when required. For instance, when an increased interference level is present on a channel carrying the acknowledgement message, the transmitting entity, i.e., in the present case, the Node B, may switch the configured feedback mode.

Hence, according to this advantageous embodiment of the invention, the transmitting entity obtains information on an interference level on the channel carrying the acknowledgement message. Based on this obtained interference level, the transmitting entity switches from the configured first acknowledgement mode, i.e. the multi-level acknowledgement mode, to the second acknowledgement mode, i.e. the conventional ACK/NACK feedback mode, when the interference level obtained at the transmitting entity is larger than a predetermined value, and switches back from the conventional ACK/NACK acknowledgement mode to the multi-level acknowledgement mode when the interference level obtained at the transmitting entity is smaller than the predetermined value.

The Node B may also, in another embodiment of the invention, switch from the multi-level acknowledgment mode to the conventional ACK/NACK acknowledgement mode, when a decoding quality of the acknowledgement message received at the Node B is smaller than a predetermined value. When the decoding quality of the acknowledgement message received at the Node B is larger than the predetermined value, the Node B switches back from the conventional ACK/NACK feedback mode to the configured multi-level feedback mode.

After switching from the configured first acknowledgement mode to the second acknowledgement mode and/or switching back from the second acknowledgement mode to the first configured acknowledgement mode, the transmitting entity signals the acknowledgement mode to the receiving entity.

As explained before, both receiving and transmitting entity are synchronized in terms of HARQ feedback mode, in order to avoid performance losses. Indeed, in case the transmitting entity assumes e.g. a conventional ACK/NACK feedback mode, whereas the receiving entity assumes a multi-level feedback mode, the additional information provided by the multi-level feedback wouldn't be exploited by the transmitting entity for the adjustment of re-transmissions and, hence, the performance would be degraded.

Another example of this performance loss in case the transmitting and receiving entity are not synchronized will be illustrated in the following when the HARQ feedback is transmitted by MAC signaling. Each possible feedback message corresponds to a codeword. A simple realization of using code words for Multi-level ACK/NACK is shown in the table below:

| ACK | 1 1 1 1 1 1 1 1 1 1 |
|---|---|
| Lost | 1 0 1 0 1 0 1 0 1 0 |
| NACK | 0 0 0 0 0 0 0 0 0 0 |

"Lost" denotes a third level of feedback, indicating for example that the transmitting entity should retransmit a self-decodable version of the data packet. If the transmitting entity is not aware of the number of code words used for the HARQ feedback signaling, the decoding performance would be degraded.

In order to guarantee that both transmitting and receiving entity use the same HARQ feedback mode after switching, a confirmation message of the feedback mode is exchanged between the transmitting and receiving entity.

The signaling for the fast HARQ feedback mode switching initiated autonomously by the transmitting or receiving entity can be done via physical layer signaling or L2 signaling, i.e. MAC signaling. For the exemplary case that the UE wants to switch from the configured multi-level feedback mode to the conventional ACK/NACK feedback mode due to transmission power limitation, the UE sends a MAC control PDU to the Node B indicating the switch of the HARQ feedback mode. Upon reception of this MAC control PDU, the Node B sends a response to the UE confirming the reception of the MAC control PDU. The response message could be, for example, an ACK message or another MAC control PDU.

In a further embodiment, the radio access network may also explicitly indicate whether the Node B and/or the UE are allowed to autonomously switch on and off the multi-level NACK signaling due to some critical scenarios, when setting up or reconfiguring a radio bearer or a HARQ protocol via RRC signaling.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:
1. A method for configuring an acknowledgement mode of a HARQ re-transmission protocol used for acknowledging a delivery of data packets containing data of a service provided from a transmitting entity to a receiving entity in a wireless communication system further comprising a controlling entity in a radio access network, the method comprising the following steps:
configuring, by the controlling entity, based on at least one of a Quality of Service attribute or a physical layer parameter, one of a first and a second acknowledgement mode according to which the HARQ re-transmission protocol can be operated, wherein the configured acknowledgement mode is to be used by the receiving entity for acknowledging the delivery of data packets, transmitting a data packet from the transmitting entity to the receiving entity, receiving and decoding the data packet by the receiving entity, and transmitting an acknowledgement message according to the configured acknowledgement mode in response to the receiving of said data packet by the receiving entity, wherein, in case the data packet has not been decoded successfully by the receiving entity, the acknowledgement message in the first acknowledgement mode indicates one of a plurality of decoding quality levels of the data packet obtained when decoding the data packet at the receiving entity, and wherein, in case the data packet has not been decoded successfully by the receiving entity, the acknowledgement message in the second acknowledgement mode indicates a decoding failure of the data packet.

2. The method according to claim 1, further comprising signaling, by the controlling entity, the configured acknowledgement mode to the transmitting entity and to the receiving entity.

3. The method according to claim 1, wherein the controlling entity is included in the transmitting entity, the configuring step is performed by the transmitting entity, and the method further comprises signaling the configured acknowledgement mode from the transmitting entity to the receiving entity.

4. The method according to claim 1, wherein the controlling entity is included in the receiving entity, the configuring step is performed by the receiving entity, and the method further comprises signaling the configured acknowledgement mode from the receiving entity to the transmitting entity.

5. The method according to claim 1, wherein the configured acknowledgement mode is signaled in a radio bearer configuring message exchanged during a radio bearer establishment procedure and/or radio bearer reconfiguration procedure.

6. The method according to claim 1, further comprising attributing the first acknowledgement mode to a first HARQ process and/or the second acknowledgement mode to a second HARQ process, and selecting one of the first and second HARQ processes for transmitting the service based on the configured acknowledgement mode.

7. The method according to claim 1, wherein the physical layer parameter comprises a typical data packet size used to transmit the service, and the first acknowledgement mode is configured when the typical data packet size is larger than a first predetermined value, and the second acknowledgement mode is configured when the typical data packet size is smaller than said first predetermined value.

8. The method according to claim 1, wherein the Quality of Service parameter is a bit-rate of the service provided from the transmitting entity to the receiving entity, and the first acknowledgement mode is configured when the bit-rate is larger than a second predetermined value, and the second acknowledgement mode is configured when the bit-rate is smaller than said second predetermined value.

9. The method according to claim 1, wherein the first acknowledgement mode is configured, and said method further comprises:

switching, by the receiving entity, from the configured first acknowledgement mode to the second acknowledgement mode when a transmission power level of the receiving entity is higher than a third predetermined value, and switching back, by the receiving entity, from the second acknowledgement mode to the first acknowledgement mode when the transmission power level of the receiving entity is smaller than the third predetermined value.

10. The method according to claim 9, further comprising signaling, by the receiving entity, the acknowledgement mode to the transmitting entity after switching from the first acknowledgement mode to the second acknowledgement mode and/or switching back from the second acknowledgement mode to the first acknowledgement mode.

11. The method according to claim 1, wherein the first acknowledgement mode is configured, and said method further comprises:

obtaining, by the transmitting entity, information on an interference level on a channel carrying the acknowledgement message, switching, by the transmitting entity, from the configured first acknowledgement mode to the second acknowledgement mode when the interference level obtained at the transmitting entity is larger than a fourth predetermined value, and switching back, by the transmitting entity, from the second acknowledgement mode to the first acknowledgement mode when the interference level obtained at the transmitting entity is smaller than the fourth predetermined value.

12. The method according to claim 1, wherein the first acknowledgement mode is configured, and said method further comprises:

decoding, by the transmitting entity, the acknowledgement message transmitted by the receiving entity, switching, by the transmitting entity, from the configured first acknowledgement mode to the second acknowledgement mode when a decoding quality of the acknowledgement message is smaller than a fifth predetermined value, and switching back, by the transmitting entity, from the second acknowledgement mode to the first acknowledgement mode when the decoding quality of the acknowledgement message is larger than the fifth predetermined value.

13. The method according to claim 11, further comprising signaling, by the transmitting entity, the acknowledgement mode to the receiving entity after switching from the first acknowledgement mode to the second acknowledgement mode and/or switching back from the second acknowledgement mode to the first acknowledgement mode.

14. The method according to claim 1, wherein the transmitting entity is a base station within the radio access network and the receiving entity is a mobile terminal.

15. The method according to claim 1, wherein the transmitting entity is a mobile terminal and the receiving entity is a base station within the radio access network.

16. The method according to claim 14, wherein the physical layer parameter further comprises a Soft Handover status of the mobile terminal, and the second acknowledgement mode is configured when the mobile terminal is handed over from a first base station to a second base station during a Soft Handover.

17. A method for configuring an acknowledgement mode of a HARQ re-transmission protocol used for acknowledging a delivery of data packets containing data of a service provided from a transmitting entity to a receiving entity in a wireless communication system further comprising a controlling entity in a radio access network, the method comprising the following steps:
  configuring, by the controlling entity, based on a radio resource allocation type used for transmission of data packets from the transmitting entity to the receiving entity one of a first and a second acknowledgement mode according to which the HARQ re-transmission protocol can be operated, wherein the configured acknowledgement mode is to be used by the receiving entity for acknowledging the delivery of data packets,
  transmitting a data packet from the transmitting entity to the receiving entity,
  receiving and decoding the data packet by the receiving entity, and
  transmitting an acknowledgement message according to the configured acknowledgement mode in response to the receiving of said data packet by the receiving entity,
  wherein, in case the data packet has not been decoded successfully by the receiving entity, the acknowledgement message in the first acknowledgement mode indicates one of a plurality of decoding quality levels of the data packet obtained when decoding the data packet at the receiving entity, and
  wherein, in case the data packet has not been decoded successfully by the receiving entity, the acknowledgement message in the second acknowledgement mode indicates a decoding failure of the data packet.

18. The method according to claim 17, wherein the first acknowledgement mode is configured when a localized radio resource allocation type is used and the second acknowledgement mode is configured when a distributed radio resource allocation type is used.

19. A wireless communication system comprising a transmitting entity, a receiving entity and a controlling entity in a radio access network,
  wherein said wireless communication system configures an acknowledgement mode of a HARQ re-transmission protocol used for acknowledging a delivery of data packets containing data of a service provided from the transmitting entity to the receiving entity,
  wherein the controlling entity comprises a configuring unit for configuring, based on at least one of a Quality of Service attribute or a physical layer parameter, one of a first and a second acknowledgement mode according to which the HARQ re-transmission protocol can be operated, wherein the configured acknowledgement mode is to be used by the receiving entity for acknowledging the delivery of data packets,
  wherein the transmitting entity comprises a transmitting unit for transmitting a data packet to the receiving entity,
  the receiving entity comprises receiving and decoding units for receiving and decoding the transmitted data packet, and a transmitting unit for transmitting an acknowledgement message according to the configured acknowledgement mode in response to the receiving of said data packet by the receiving entity,
  wherein, in case the data packet has not been decoded successfully by the receiving entity, the acknowledgement message in the first acknowledgement mode indicates one of a plurality of decoding quality levels of the data packet obtained when decoding the data packet at the receiving entity, and
  wherein, in case the data packet has not been decoded successfully by the receiving entity, the acknowledgement message in the second acknowledgement mode indicates a decoding failure of the data packet.

20. The wireless communication system according to claim 19, wherein the controlling entity signals the configured acknowledgement mode to the transmitting entity and to the receiving entity.

21. The wireless communication system according to claim 19, wherein the controlling entity is included in the transmitting entity, and the transmitting entity configures the acknowledgement mode and signals the configured acknowledgement mode to the receiving entity.

22. The wireless communication system according to claim 19, wherein the controlling entity is included in the receiving entity, and the receiving entity configures the acknowledgement mode and signals the configured acknowledgement mode to the transmitting entity.

23. The wireless communication system according to claim 19, wherein the controlling entity signals the configured acknowledgement mode in a radio bearer configuring message exchanged during a radio bearer establishment procedure and/or radio bearer reconfiguration procedure.

24. The wireless communication system according to claim 19, wherein the controlling entity further attributes the first acknowledgement mode to a first HARQ process and/or the second acknowledgement mode to a second HARQ process, and is configured to select one of the first and second HARQ processes for transmitting the service based on the configured acknowledgement mode.

25. The wireless communication system according to claim 19, wherein the physical layer parameter is a typical data packet size used to transmit the service, and the controlling entity configures the first acknowledgement mode when the typical data packet size is larger than a first predetermined value and the second acknowledgement mode when the typical data packet size is smaller than said first predetermined value.

26. The wireless communication system according to claim 19, wherein the Quality of Service parameter is a bit-rate of the service provided from the transmitting entity to the receiving entity, and the controlling entity is further configures the first acknowledgement mode when the bit-rate is larger than a second predetermined value and the second acknowledgement mode when the bit-rate is smaller than said second predetermined value.

27. The wireless communication system according to claim 19, wherein the first acknowledgement mode is configured, and the receiving entity is configured to switch from the configured first acknowledgement mode to the second acknowledgement mode when a power level of the mobile terminal is higher than a third predetermined value and to switch back from the second acknowledgement mode to the first acknowledgement mode when the power level of the mobile terminal is smaller than the third predetermined value.

28. The wireless communication system according to claim 27, wherein the receiving entity is configured to signal the acknowledgement mode to the transmitting entity after switching from the first acknowledgement mode to the second acknowledgement mode and/or switching back from the second acknowledgement mode to the first acknowledgement mode.

29. The wireless communication system according to claim 19, wherein the first acknowledgement mode is configured, and the transmitting entity is configured to obtain information on an interference level on a channel carrying the acknowledgement message and to switch from the configured first acknowledgement mode to the second acknowledgement mode when the interference level is larger than a fourth predetermined value, and to switch back from the second acknowledgement mode to the first acknowledgement mode when the interference level is smaller than the fourth predetermined value.

30. The wireless communication system according to claim 19, wherein the first acknowledgement mode is configured, the transmitting entity is configured to decode the acknowledgement message transmitted by the receiving entity and to switch from the configured first acknowledgement mode to the second acknowledgement mode when a decoding quality of the acknowledgement message is smaller than a fifth predetermined value, and to switch back from the second acknowledgement mode to the first acknowledgement mode when the decoding quality of the acknowledgement message is larger than the fifth predetermined value.

31. The wireless communication system according to claim 29, wherein the transmitting entity is configured to signal the acknowledgement mode to the receiving entity after switching from the first acknowledgement mode to the second acknowledgement mode and/or switching back from the second acknowledgement mode to the first acknowledgement mode.

32. The wireless communication system according to claim 19, wherein the transmitting entity is a base station within the radio access network and the receiving entity is a mobile terminal.

33. The wireless communication system according to claim 19, wherein the transmitting entity is a mobile terminal and the receiving entity is a base station within the radio access network.

34. The wireless communication system according to claim 32, wherein the physical layer parameter further comprises a Soft Handover status of the mobile terminal, and the controlling entity further configures the second acknowledgement mode when the mobile terminal is handed over from a first base station to a second base station during a Soft Handover.

35. A wireless communication system comprising a transmitting entity, a receiving entity and a controlling entity in a radio access network, wherein said wireless communication system configures an acknowledgement mode of a HARQ re-transmission protocol used for acknowledging a delivery of data packets containing data of a service provided from the transmitting entity to the receiving entity, wherein the controlling entity comprises a configuring unit for configuring, based on a radio resource allocation type used for transmission of data packets from the transmitting entity to the receiving entity, one of a first and a second acknowledgement mode according to which the HARQ re-transmission protocol can be operated, wherein the configured acknowledgement mode is to be used by the receiving entity for acknowledging the delivery of data packets, wherein the transmitting entity comprises a transmitting unit for transmitting a data packet to the receiving entity, the receiving entity comprises receiving and decoding units for receiving and decoding the transmitted data packet, and a transmitting unit for transmitting an acknowledgement message according to the configured acknowledgement mode in response to the receiving of said data packet by the receiving entity, wherein, in case the data packet has not been decoded successfully by the receiving entity, the acknowledgement message in the first acknowledgement mode indicates one of a plurality of decoding quality levels of the data packet obtained when decoding the data packet at the receiving entity, and wherein, in case the data packet has not been decoded successfully by the receiving entity, the acknowledgement message in the second acknowledgement mode indicates a decoding failure of the data packet.

36. The wireless communication system according to claim 35, wherein the controlling entity configures the first acknowledgement mode when a localized radio resource allocation type is used and the second acknowledgement mode when a distributed radio resource allocation type is used.

* * * * *